(12) United States Patent
Branda et al.

(10) Patent No.: US 10,310,300 B2
(45) Date of Patent: Jun. 4, 2019

(54) OPTICAL FILTER WITH LIGHT SOURCE

(71) Applicant: Switch Materials, Inc., Burnaby (CA)

(72) Inventors: Neil Robin Branda, Burnaby (CA); Jeremy Graham Finden, Burnaby (CA); Duhane Lam, Burnaby (CA); Jonathan Ross Sargent, Burnaby (CA); Cynthia Elizabeth Shippam, Burnaby (CA); Douglas Malcolm Wiggin, Burnaby (CA)

(73) Assignee: SWITCH MATERIALS, INC., Burnaby (BC) (CA)

( * ) Notice: Subject to any disclaimer, the term of this patent is extended or adjusted under 35 U.S.C. 154(b) by 0 days.

(21) Appl. No.: 15/875,863

(22) Filed: Jan. 19, 2018

(65) Prior Publication Data

US 2018/0210240 A1 Jul. 26, 2018

Related U.S. Application Data

(63) Continuation of application No. 14/380,607, filed as application No. PCT/CA2013/000176 on Feb. 22, 2013, now Pat. No. 9,910,301.

(Continued)

(30) Foreign Application Priority Data

Sep. 28, 2012 (WO) ................ PCT/CA2012/000910
Jan. 21, 2013 (WO) ................ PCT/CA2013/000054

(51) Int. Cl.
G02F 1/03 (2006.01)
G02F 1/07 (2006.01)

(Continued)

(52) U.S. Cl.
CPC ............ *G02F 1/0126* (2013.01); *G02B 5/23* (2013.01); *G02B 26/02* (2013.01); *G02C 7/102* (2013.01);

(Continued)

(58) Field of Classification Search
CPC ...... G02F 1/0126; G02F 2203/10; G02B 5/23

(Continued)

(56) References Cited

U.S. PATENT DOCUMENTS 6,065,836 A 5/2000 Krishnan et al.
6,366,388 B1 4/2002 Hampp (Continued)

FOREIGN PATENT DOCUMENTS

JP 64-72123 A 3/1989
JP 2000-99948 A 4/2000

(Continued)

OTHER PUBLICATIONS

Gutiérrez et al., "Polymer-based hybrid integrated optical photochromic switch", Journal of Scientific & Industrial Research, vol. 71, 2012, pp. 539-543.

(Continued)

*Primary Examiner* — William R Alexander
*Assistant Examiner* — Tamara Y. Washington
(74) *Attorney, Agent, or Firm* — Merchant & Gould P.C.

(57) ABSTRACT

An apparatus comprising a switchable optical filter comprising a layer of switchable material, the switchable material comprising a photochromic/thermochromic, a photochromic/photochromic, or a photochromic/electrochromic compound; a first light source providing light of a wavelength that causes the switchable material to transition from a faded state to a dark state, or a dark state to a faded state; and a switch for controlling activation of the first light source.

20 Claims, 11 Drawing Sheets

Related U.S. Application Data

(60) Provisional application No. 61/602,203, filed on Feb. 23, 2012.

(51) Int. Cl.
*G02B 5/23* (2006.01)
*G02C 7/10* (2006.01)
*G02F 1/01* (2006.01)
*G02F 1/15* (2019.01)
*G02B 26/02* (2006.01)

(52) U.S. Cl.
CPC .............. *G02F 1/0147* (2013.01); *G02F 1/15* (2013.01); *G02C 7/101* (2013.01)

(58) Field of Classification Search
USPC .................................................. 359/237–324
See application file for complete search history.

(56) References Cited

U.S. PATENT DOCUMENTS

| | | |
|---|---|---|
| 7,911,673 B1 | 3/2011 | Yap |
| 8,284,336 B2 | 10/2012 | Powers et al. |
| 2007/0285775 A1 | 12/2007 | Lesage et al. |
| 2009/0167971 A1 | 7/2009 | Powers et al. |
| 2011/0075096 A1 | 3/2011 | Ishak et al. |
| 2012/0044560 A9 | 2/2012 | Lam et al. |

FOREIGN PATENT DOCUMENTS

| | | |
|---|---|---|
| WO | 02/06361 A2 | 1/2002 |
| WO | 02/18132 A2 | 3/2002 |
| WO | 2004/015024 A1 | 2/2004 |
| WO | 2006/125317 A1 | 11/2006 |
| WO | 2009/087575 A2 | 7/2009 |
| WO | 2010/142019 A1 | 12/2010 |
| WO | 2013/044371 A1 | 4/2013 |
| WO | 2013/106921 A1 | 7/2013 |

OTHER PUBLICATIONS

International Search Report and Written Opinion from International Application No. PCT/CA2013/000176 dated May 23, 2013.
Irie, "Photochromism of diarylethene molecules and crystals", Proc. Jpn. Acad., Ser. B, vol. 86, No. 5, 2010, pp. 472-483.
Yamaguchi et al., "Morphology change of diarylethene derivatives having benzofuran derivatives—Photoinduced crystallization", Journal of Photochemistry and Photobiology A: Chemistry, vol. 213, 2010, pp. 141-146.
Yamaguchi et al., "Photochromism of diarylethene derivatives bearing a benzo[b]silole unit", Tetrahedron Letters, vol. 52, 2011, pp. 5601-5604.

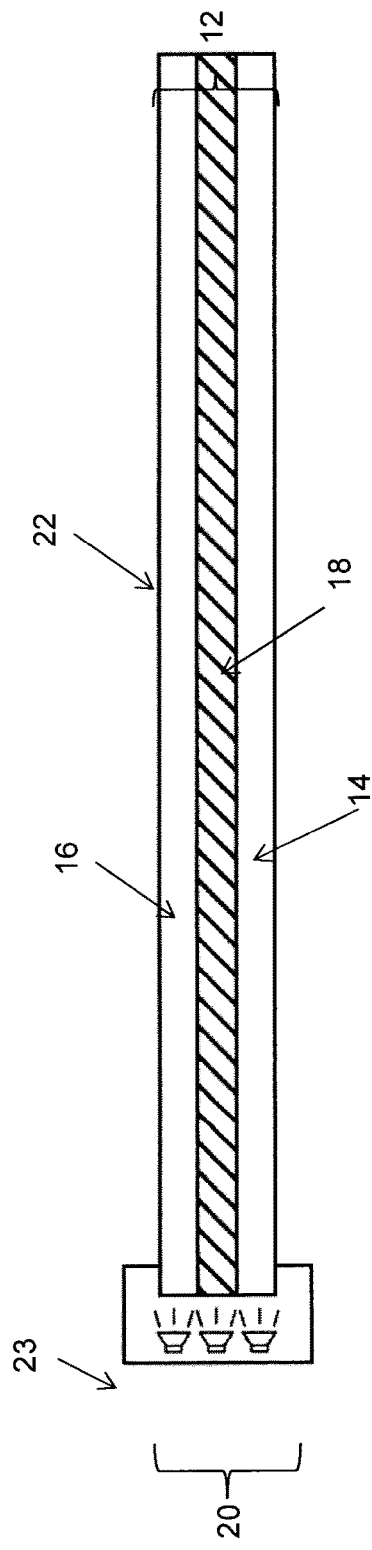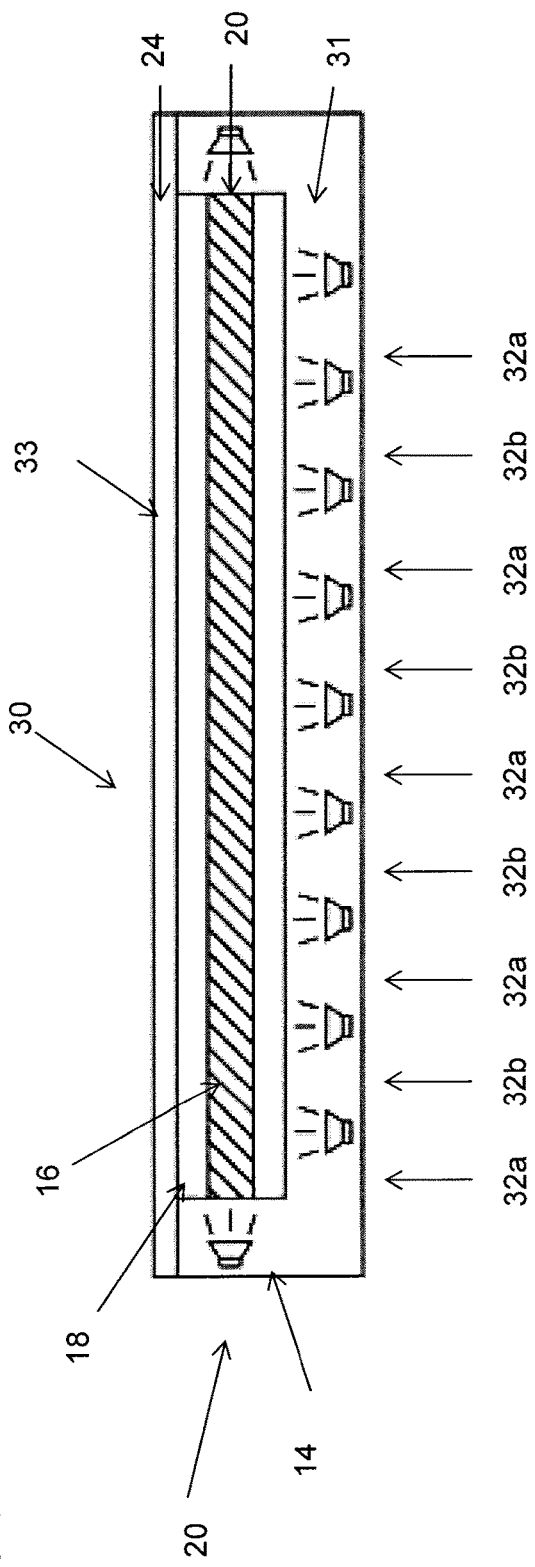
FIG. 2
FIG. 3

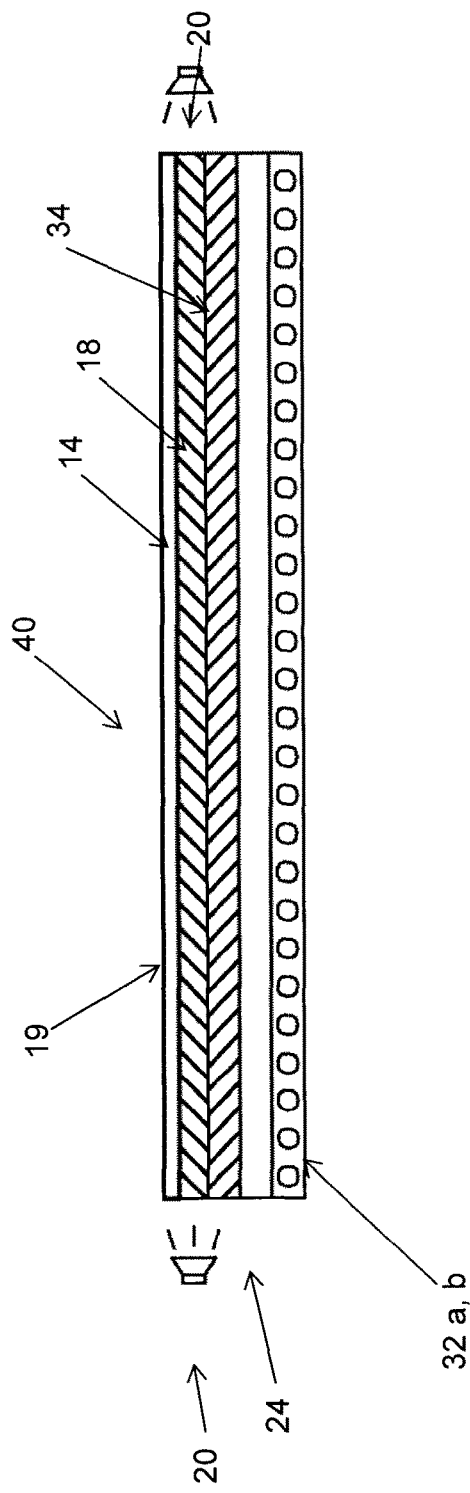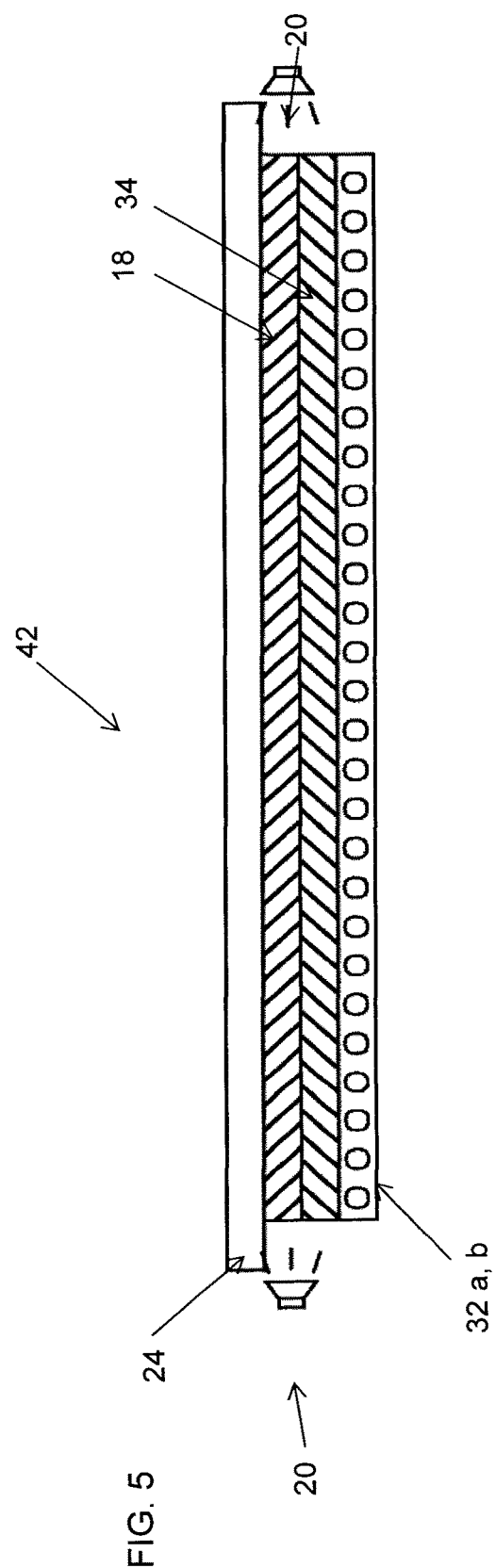
FIG. 4
FIG. 5

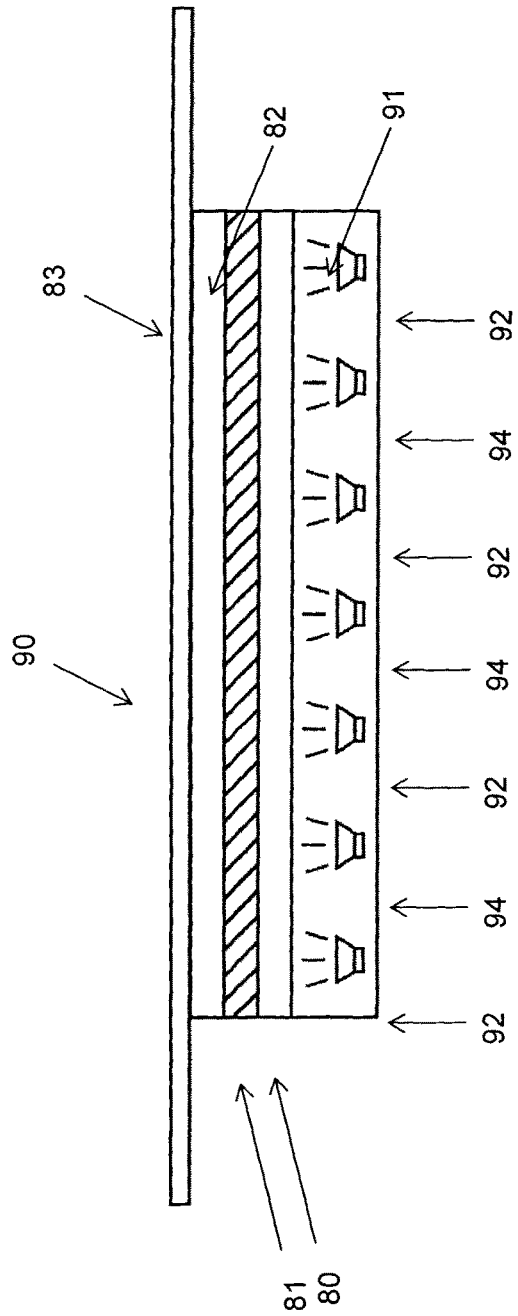

OPTICAL FILTER WITH LIGHT SOURCE

RELATED CASES

This application claims the benefit of U.S. Provisional Application No. 61/602,203, filed Feb. 23, 2012, PCT/CA2012/000910 filed Sep. 28, 2012, and PCT/CA2013/000054, filed Jan. 23, 2013, incorporated herein by reference in their entirety.

TECHNICAL FIELD

The present invention relates to an apparatus comprising optical filter and a light source. More specifically, the invention relates to an apparatus comprising a switchable optical filter and one or more light sources, the switchable optical filter capable of switching between high and low visible light transmittance.

BACKGROUND

Photochromic materials react to light levels by darkening in sunlight (or other light having a UV component), and spontaneously reverting to a faded state under low light conditions, or indoors where the UV light is removed. An example of a photochromic material is found in the TRANSITIONS™ lenses. U.S. Pat. No. 6,065,836 describes a photochromic opthalmic lens with a film comprising a photochromic dye. Both fading and darkening are 'passive', in that they occur without input of a user, or in a controllable manner. Such materials may be less useful in an environment where UV is lacking, or variable, or where temperature fluctuates. Such photochromic eyewear worn inside a vehicle on a bright day may have the darkening reaction inhibited by the low amount of UV light in the vehicle (e.g. caused by UV blocking PVB layer of the windshield). Conversely, the glasses may go dark when a user does not wish them to.

Thermochromic materials respond to temperature—US 2009/0167971 describes an optical filter comprising a liquid crystal material that is thermochromic—when used as a window film, it may be useful in attenuating heat gain in a building under some conditions, but may not be controllable to provide full light transmission under higher temperature conditions. The temperature dependent darkening and fading is passive, and may occur without the input of a user, or in a controllable manner. Such materials may be less useful where temperature fluctuates, where a dark state is desired in a low temperature environment, or where a faded state in a high temperature environment is desired.

Electrochromic materials respond to application of electricity. Some electrochromic materials (e.g. bipyridinium-group containing materials) darken with application of a voltage, but fade passively when the application ceases. Such materials may employ a conductive layer such at ITO to effect operation—where these materials are used as an overlay or underlay for some configurations of displays (e.g. touchscreens), operation of the electrochromic material (e.g. providing an electric voltage to the conductive layer of the electrochromic material) may interfere with operation of a touchscreen. The applied voltage to induce the color change may vary with the nature of the material, from a few volts to as much as 60V or 120V to effect the transition between dark and faded states. Some electrochromic materials may require continuous application of electricity to maintain their dark or faded states.

Some switchable materials may provide controllable darkening, such as electrochromic, liquid crystal or suspended particle materials, but may have other disadvantages such as cost, lack of optical clarity, reduced lifetime or haze, or may be difficult to adapt to some applications (e.g. incorporation into safety glass by lamination with PVB).

Controllable darkening may be useful not only for glazings or opthalmic applications, but for reducing or blocking light from displays. In some applications, it may be desirable for the display to be 'blacked out' when not in use. Some embodiments may overlay a device with a tinted glass with a low visible light transmittance to appear black when not in use. When it is desired to view the display or interact with the touchpad, the display screen behind the tinted glass is illuminated with a light source to visualize icons, images or the like on the display. Depending on the degree of tint of the tinted glass, the luminance necessary to make the display visible to a user may be substantial. In some applications, the light source providing a suitable level of luminance may represent a considerable power draw, and/or generate excessive heat. If the display is in a confined space (e.g. a steering column or dashboard of a vehicle, control panel of an aircraft, or the like), or used in a device that must carry or supply its own power (e.g. battery operated), the heat production and/or power draw may represent a substantial engineering obstacle. Further, excessive heat production in a confined space may affect the operation of other instruments or device, such as computer controls.

SUMMARY

A device and/or method to overcome disadvantages in the art is needed.

The present invention relates to an optical filter with a light source.

In accordance with one aspect, there is provided an apparatus comprising a switchable optical filter comprising a layer of switchable material, the switchable material comprising a photochromic/thermochromic, a photochromic/photochromic, or a photochromic/electrochromic compound; a first light source providing light of a wavelength that causes the switchable material to transition from a faded state to a dark state, or a dark state to a faded state; and a switch for controlling activation of the first light source.

In accordance with another aspect of the invention, there is provided a display apparatus comprising: a display; and a switchable optical filter comprising a layer of switchable material, the switchable material comprising a photochromic/thermochromic, a photochromic/photochromic, or a photochromic/electrochromic compound.

The apparatus, or display may further comprise one or more UV blocking layers, or one or more light dispersing (light transmitting) layers. A UV blocking layer may block light of less than about 420 nm, or less than about 400 nm, or less than about 390 nm, or less than about 380 nm, or less than about 370 nm, or less than about 360 nm.

The apparatus or display may further comprise a second light source.

The switching material may comprise a compound selected from a group comprising: diarylethenes, dithienylethenes, fulgides, hexatrienes, cyclopentadienes, azobenzenes, spiropyrans, spirooxazines, polymers comprising one or more of such organic molecules, conjugated polymers, or metal oxides (e.g. $WO_3$, $TiO_2$ or the like). The switching material may comprise a photochromic/electrochromic compound. The switching material may comprise a compound according to Formula I, Formula II or Formula I and II. The switching material may be thermally stable in both a dark state and a faded state.

The first, the second, or the first and the second light sources may provide light in the UV or VIS range. In some aspects, the light may be of less than 450 nm, or from about 350 to about 450 nm, or from about 380 to about 420 nm, or any amount or range therebetween. In some aspects, the light may be from about 450 to about 750 nm, or from about 450 to about 650 nm, or from about 575 to about 650 nm, or any amount or range therebetween.

The optical filter may be transitionable from a faded state to a dark state with application of 350 to 420 nm light, and transitionable from a dark state to a faded state with application of 450 to 650 nm light, or light with a wavelength of from about 575 to about 650 nm, or electricity. In some aspects, the switchable optical filter may be transitionable from a faded state to a dark state with application of 350 to 420 nm light, and transitionable from a dark state to a faded state with application of 450 to 650 nm light, or light with a wavelength of from about 575 to about 650 nm, or electricity. In some aspects, the switchable material may comprises a compound according to Formula I and a compound according to Formula II, and is transitionable from a faded state, to a dark state of 1% or less light transmittance with application of UV light.

In some aspects, the first, second or first and second light sources may be adjacent to one or more edges of the switchable optical filter, or adjacent to one or more surfaces of the switchable optical filter, or at a periphery of the optical filter. In some aspects the first light source, the second light source or the first and the second light sources are on a plane parallel, or substantially parallel to the display. The optical filter may be spaced apart, or in contact with, a surface of the display. The display may be backlit, edgelit or backlit and edgelit by a light source.

The apparatus may be used in a display, opthalmic device, architectural installation, wall, glazing, vehicle, dashboard or other control panel. The display may be configured to display information relevant to operation of a vehicle, instrumentation of a vehicle, and/or a controller for controlling instrumentation of a vehicle.

The display may comprise a liquid crystal display (LCD), an OLED display or an electroluminescent liquid crystal display; the OLED display may be transparent and/or flexible. The display may be an interactive display, and/or may be configured to receive user input and/or provide a user tactile feedback. The display may comprise a touchscreen, such as The display apparatus of claim 30 wherein the display comprises a touchscreen such as a resistive touchscreen, a capacitive touchscreen, a surface wave touchscreen, an infrared touchscreen a dispersive signal touchscreen or an acoustic pulse recognition touchscreen.

The apparatus of claim 1 wherein the switchable optical filter is transitionable to a variable light transmittance of about 0 to about 5% on exposure to light of a first wavelength, and to a light transmittance of from about 30% to about 90% on exposure to light of a second wavelength.

The switchable optical filter comprising a light source may be adapted to retrofit an existing display by application of the switchable optical filter to a surface of the display. The light source may be connected to the vehicle's electrical system; a switch may further be provided to operate the light source as desired.

This summary of the invention does not necessarily describe all features. Other aspects, features and advantages will become apparent to those of ordinary skill in the art upon review of the following description of specific embodiments.

BRIEF DESCRIPTION OF THE DRAWINGS

These and other features will become more apparent from the following description in which reference is made to the appended drawings wherein:

FIG. 2 shows a detail view of a portion of the apparatus of FIG. 1.

FIGS. 3-6a, b shows a sectional view of an apparatus (display with light source and switchable optical filter) according to various embodiments.

FIG. 10 shows a sectional view of an apparatus (display with light source) according to another embodiment.

FIG. 11 shows a sectional view of an apparatus (vehicle glazing) according to another embodiment.

DESCRIPTION

Figure 1:
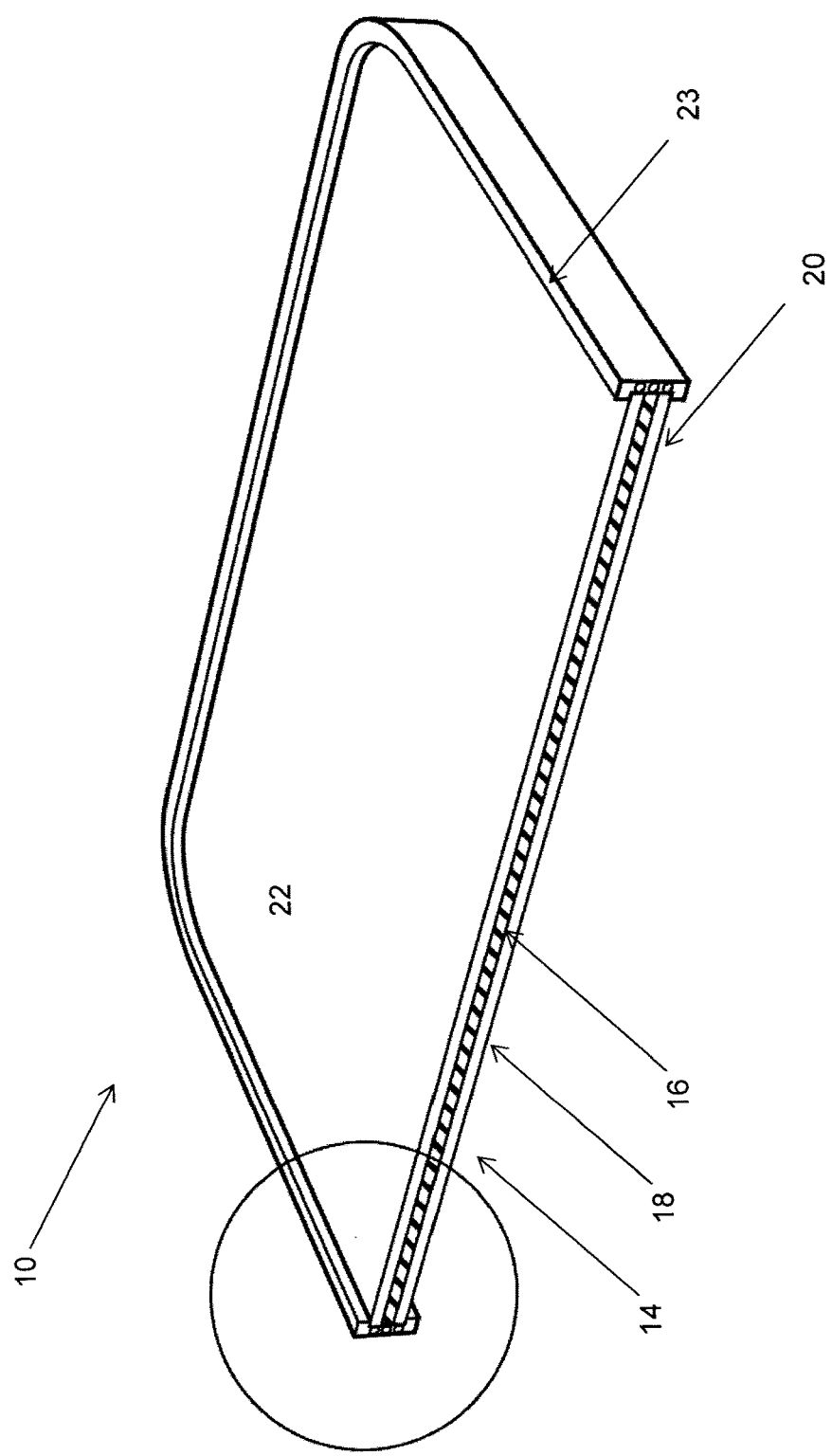
FIG. 1 shows a sectional view of an apparatus according to one embodiment.

The present disclosure describes, in part, an apparatus comprising a photochromic switching material that may be controllably darkened. Control of fading, darkening or both fading and darkening may be accomplished by a light source that may be controlled to stimulate the switching material with light (electromagnetic radiation) of a suitable wavelength to alter the light transmissibility of the material in a controllable manner. The light source may be selected to provide light in the UV, VIS and/or IR range, or a portion thereof, as may be suitable for the switching material, and the intended transition (dark to faded state, or faded to dark state). The light source may be integrated into the apparatus in a variety of ways as described or illustrated herein. In some embodiments, filters that selectively transmit or exclude selected wavelengths of light may be included in the apparatus.

In some embodiments, the apparatus may provide controllable darkening of the switching material in situations where darkening would not occur passively (e.g. indoors, vehicle interiors). In some embodiments, the apparatus may be incorporated into a device or system to control the brightness or visibility of a display, or display elements. In some embodiments, the apparatus may provide for controlled darkening of a photochromic/electrochromic glazing that may be used in architectural or vehicle applications. Exterior glazings may be darkened at night (when no daylight is present); interior glazings may be controllably darkened when exposure to sunlight is not available.

The disclosure provides, in part, an apparatus comprising a switchable optical filter, a first light source and optionally a second light source, the light sources configured to provide light to the optical filter. The apparatus may be configured for use with a display.

A switchable optical filter according to various embodiments of the invention may be cycled between dark and faded states by exposure to selected first and second wavelengths of light, light and heat, or light and electricity. The optical filter may further be thermally stable, or unresponsive to a range of temperatures. The optical filter, and/or a device comprising such an optical filter, viable for a variety of applications including opthalmic devices (e.g. visors, masks, goggles, lenses, eyeglasses (prescription or not) or the like), architectural windows, architectural installations such as a wall (e.g. partition, divider, full or partial wall, permanent or temporary wall), display (e.g. illuminated information panels, touchscreens, control panels), vehicle window or glazing, and vehicle sunroofs of various types including pop-up, spoiler, inbuilt, folding sunroofs, panoramic roof systems or removable roof panels. Electrical power to illuminate a light source may be provided by a separate battery, or the optical filter may be connected to an electrical system of the device (e.g. it may be wired into a vehicle's electrical system). The optical filter may demonstrate rapid switching between dark and light states, which may be advantageous in applications where frequent or rapid changes in lighting conditions occur, for example automotive applications, display applications or opthalmic applications. The optical filter may exhibit minimal or no change in light transmittance in response to temperature, which may be advantageous in applications where frequent or rapid changes in temperature conditions occur, for example automotive applications, display applications architectural applications or opthalmic applications. The optical filter may be stable in that switching from a dark to a faded state, and/or from a faded to a dark state, does not occur unless the appropriate light source is applied (a bistable optical filter). The optical filter may exhibit photostability and durability suitable for use in various applications, including those referenced herein, and may be cycled between light and dark states many times.

Light transmittance (LT) of an optical filter may be controlled by controlling the light to which the optical filter is exposed. The optical filter may be exposed to UV light continuously, intermittently or as a single 'dose' for a defined period of time (e.g. controlled by an operable switch and optionally with a timer to turn the switch off or on after a defined period of time; the operable switch may be operated by a user, or by a control circuit) to switch the optical filter or to maintain the optical filter in a faded or a dark state.

The disclosure further provides, in part, a display apparatus ("display") comprising a display and a switchable optical filter, the switchable optical filter adjacent to, or offset from, a surface of the display by a suitable distance. The display may further comprise a first light source, and optionally a second light source, the first, second or first and second light sources configured to provide light to the switchable optical filter and/or the display.

A display may be used in a variety of applications to convey words, images or information to a viewer. Vehicle dashboards, steering column displays, video screens of various configurations, household appliance, monitors, control panels or the like may use one or more of LCD technology, organic light emitting diode (OLED), cathode ray tube (CRT), backlighting, edgelighting or the like to portray the intended information. Edge lighting may be facilitated by a light source along one or more edges of the apparatus (a peripheral light source), or optical filter of the apparatus. Such displays may be further coupled with an interactive aspect, such as capacitive touch or resistive touch, so that a user may interact with the display and make selections, control aspects of the device or other devices to which the display/control panel is linked. A display may be transparent, flexible or transparent and flexible. A display may be transparent to VIS light, but not to UV light. A display may have an interactive aspect (e.g. resistive touchscreen, capacitive touchscreen, or the like).

A variable transmittance optical filter (switchable optical filter) has a light transmittance that is variable upon application of a stimulus, the stimulus may be light or electricity, or both light and electricity. A switchable optical filter comprises a first, and optionally a second, substantially transparent substrate and a layer of switching material. The first and second substrates may each be rigid or flexible; where the first and second substrates are flexible, the switching material may also be flexible. The switching material may be transitionable from a first light transmittance state to a second light transmittance state with application of one or more of UV or VIS light; the switching material may be stable in a faded state and not undergo thermal darkening; the switching material may be stable in a dark state and not undergo thermal fading.

A switchable optical filter may comprise one or more layers of switching material applied to a substrate, or between first and second substrates. In some embodiments, the switching material may be applied to a surface of a display (e.g. applied to the clear glass or plastic of the display), or may be mounted adjacent to and offset from, a surface of the display. An optical filter comprising two or more layers of switching material may further comprise a transparent layer between the layers of switching material. The transparent layer may be a light distributing layer. A light distributing layer may be transparent or substantially transparent to light perpendicular to the layer. In some embodiments, the light distributing layer is optically clear, or substantially optically clear. The light distributing layer may distribute light across the optical filter (from one side to another) to illuminate the switching material and effect a transition from faded to dark state, or from dark to faded state. The light transmitted through the light transmitting layer may be provided by a light source integrated into the optical filter. Illumination of the switching material may be provided by one or more light sources along one or more edges, along one or more planes, or along one or more edges and one or more planes of the optical filter. A light distributing layer may convey light from an edge light source across the switching material.

An illuminated display, for example a display mounted in a vehicle (e.g. dashboard, steering column, seat back or the like) may be useful in providing information, and/or a controller or controlling means for controlling operations of a vehicle (e.g. touchscreens or the like). The brightness of such a display may be manually adjusted by a user, or a sensor that detects the ambient lighting intensity may provide a signal to a control circuit to dim or brighten the display as appropriate, to facilitate viewing. When visualization of the display is not needed or desired, the illumination source may be switched off, however there may be residual lighting, 'screen burn', or the existing colour of the display that prevents a uniform dark, or 'blackout', appearance from being achieved. To achieve a uniform dark appearance, an optical filter may be placed in front of the display, the optical filter transitionable from a light state to a dark state on exposure to light of a first wavelength, and from a dark state to a light state on exposure to light of a second wavelength.

Referring to FIGS. 1 and 2, an apparatus according to some embodiments is shown generally at 10. A switchable optical filter 12 comprising a first substrate 14, a second substrate 16 and a layer of switching material 18 disposed between first and second substrates has a light source 20; the light source may surround the edge of the apparatus (e.g. a circumferential light source) or may be along only a subset of sides of the apparatus; the light source may further be connected to a power source (not shown). Frame 23 may surround the optical filter and light source. Electrical connectors (not shown) connecting the light source(s) to a source of voltage may be contained within the frame. In some embodiments frame 23 may comprise a reflective component on an inside surface, and may reflect light from the light source towards the layer of switching material 18. Surface 22 of substrate 16 may have a layer applied thereto, the layer may selectively block or transmit light incident on the apparatus. The layer may be a UV blocking layer, or a coloured layer (a static filter) to selectively transmit visible light of selected colour, or an anti-glare, anti-scratch, anti-reflective or other layer. The layer may be a component of substrate 16, or may be a separately-applied layer. In some embodiments, the frame may surround the edges of a display upon which the optical filter is fastened, or rests. The light source 20 may provide a first, a second or both first and second wavelengths of light (e.g. from separate light emitting diodes (LEDs) or LED arrays) across the switching material, and, through the layers of the optical filter and display. A control circuit may control the light source(s) so that when a light source providing a first wavelength of light is on, a light source providing a second wavelength is off, and vice versa. The control circuit may further comprise a switch, and may be connected to an electrical system of a vehicle to provide power to the LEDs. FIG. 2 shows a detail view of the apparatus of FIG. 1. The detail view shows 3 light sources (which may be arranged in rows along the edges of the optical filter), however other configurations of 1, 2 or more rows or arrays of light sources are also contemplated.

Referring to FIG. 3, an apparatus according to another embodiment of the invention is shown generally at 30. A display 24 has an optical filter 12 comprising first and second substrates and a layer of switching material therebetween applied to a surface. A housing 31 surrounds the optical filter and contains light sources 32a, 32b and 20, along with control circuitry and electrical connectors for operation of the light source and controllable illumination of the optical filter. Light sources 32a, b, providing illumination through the layers, including the optical filter and display, light sources 20 provide illumination across the optical filter from the side. A light transmitting layer (not shown) may further be included in the apparatus. The display may further have a UV blocking layer applied to one or more surfaces; such as surface 33. In some embodiments, light source 20, 32a,32 b may provide the same, or different type of light. Light sources 20, 32a, 32b may comprise an array of light emitting diodes (LEDs), providing light of a first, and optionally a second wavelength. Light source 32a, b may be a planar array of LEDs or OLED. In some embodiments, light source 32a, b may be a planar LED light, or OLED. Light source 20 may be a linear array of LEDs, of one, two or more rows. The housing may further comprise mounting of fastening components (nuts, bolts, fasteners or the like) for mounting the housing comprising the optical filter and display in a panel, such as a dashboard or other desired site.

Referring to FIGS. 4 and 5, an apparatus according to another embodiment of the invention is shown generally at 40. A display 24 comprises an optical filter comprising a first switching material 18, a second switching material 34 and a substrate 14. The first and second switching materials may each comprise switching compounds with complementary light absorption profiles. A surface 19 of substrate 14 may comprise a layer UV blocking layer, or a coloured layer (a static filter) to selectively transmit visible light of selected colour, or an anti-glare, anti-scratch, anti-reflective or other layer. The layer may be a component of substrate 14, or may be a separately-applied layer. Light source 32 may provide illumination through the optical filter and display. Light source 32 may comprise an array of first 32a and second 32b LEDs. Light source 32 illuminates display 24, and also provides light to illuminate and switch first and second switching materials. Light source 20 provides additional light to illuminate and switch first and second switching materials. Light source 20 and LEDs 32 a, 32b may provide the same, or different light. FIG. 5 illustrates a further embodiment at 42, placing the switching materials 18, 34 between the light source 32 and display 24, also with peripheral light source 20. The first and second switching materials are in contact and may each comprise one or more components that are immiscible with the other. A control circuit may control the light source.

Figure 6A:
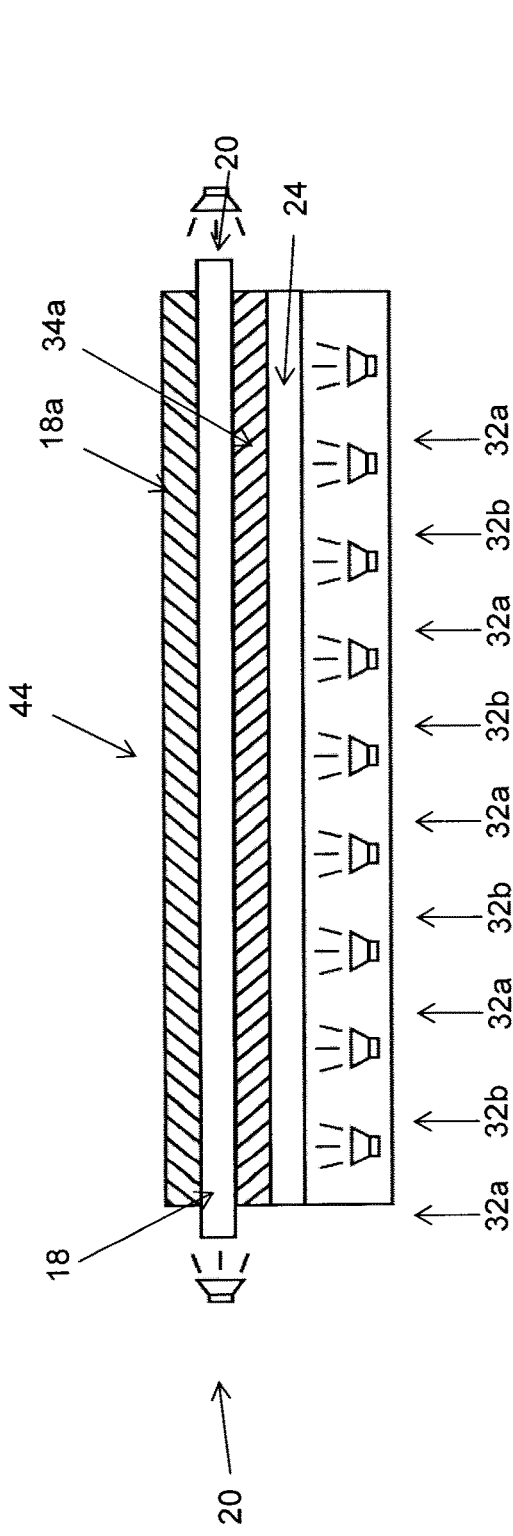

Referring to FIG. 6a, an apparatus according to another embodiment of the invention is shown generally at 44. Display 24 is illuminated by light source 32a, 32b, and is behind optical filters 18a and 34a, comprising switching material 18 and 34, respectively, with light transmitting layer 38 disposed therebetween. Peripheral light source 20 provides light that is dispersed across the optical filter. Layer 38 is transparent to light from light source, and conducts light across the optical filters so that both layer of switching material receive light; in some embodiments the light is UV light, or light in a wavelength range from about 350 nm to about 420 nm to darken the switching material, and VIS light or light in a wavelength range of from about 550 nm to about 650 nm to fade the switching material. Light source 32 may provide additional light to fade the switching material. A control circuit may control the light source.

Figure 6B:
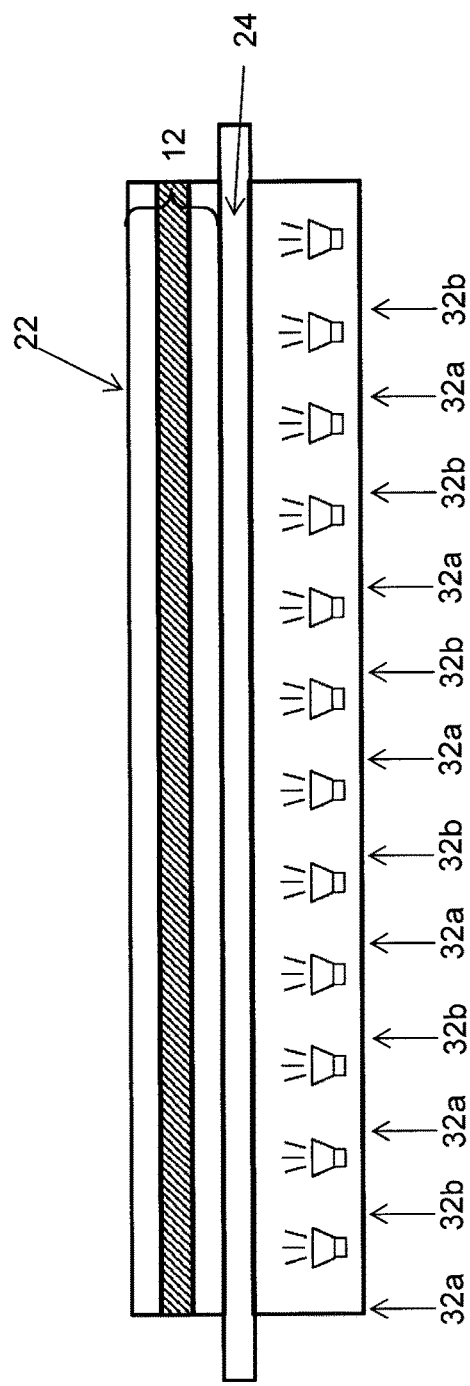

FIG. 6b shows another embodiment of the apparatus. Display 24 is illuminated by light source 32a, 32b, and is behind an optical filter 12 comprising one layer of switching material. Optical filter 12 may comprise a switching material with one, two or more chromophores. Light source 32a, 32b may provide first and second light sources, —in operation, one or both of light sources 32a, 32b may illuminate the display (e.g. backlit) and provide light to the optical filter to effect the transition from a faded state to a dark state, or vice versa. For example, where light source 32a provides light in a range of about 350 to about 420 nm (e.g. UV light), and light source 32b provides VIS light, or light in a range of about 450 to about 650 nm, turning on light source 32a may darken a switching material. When light source 32a is off and light source 32b is on, the display may be illuminated and the switching material faded. Control circuitry may be configured to alternate the light sources with the operation of a switch, thus a user can darken the optical filter when the display is not needed, and turn on the display and fade the optical filter when it is desired.

The embodiments illustrated in FIGS. 4, 5 and 6a have first and second layers of switching materials. Multiple layers of switching material may be advantageous where first and second switching materials have one or more components that are immiscible or incompatible.

Figure 7A:
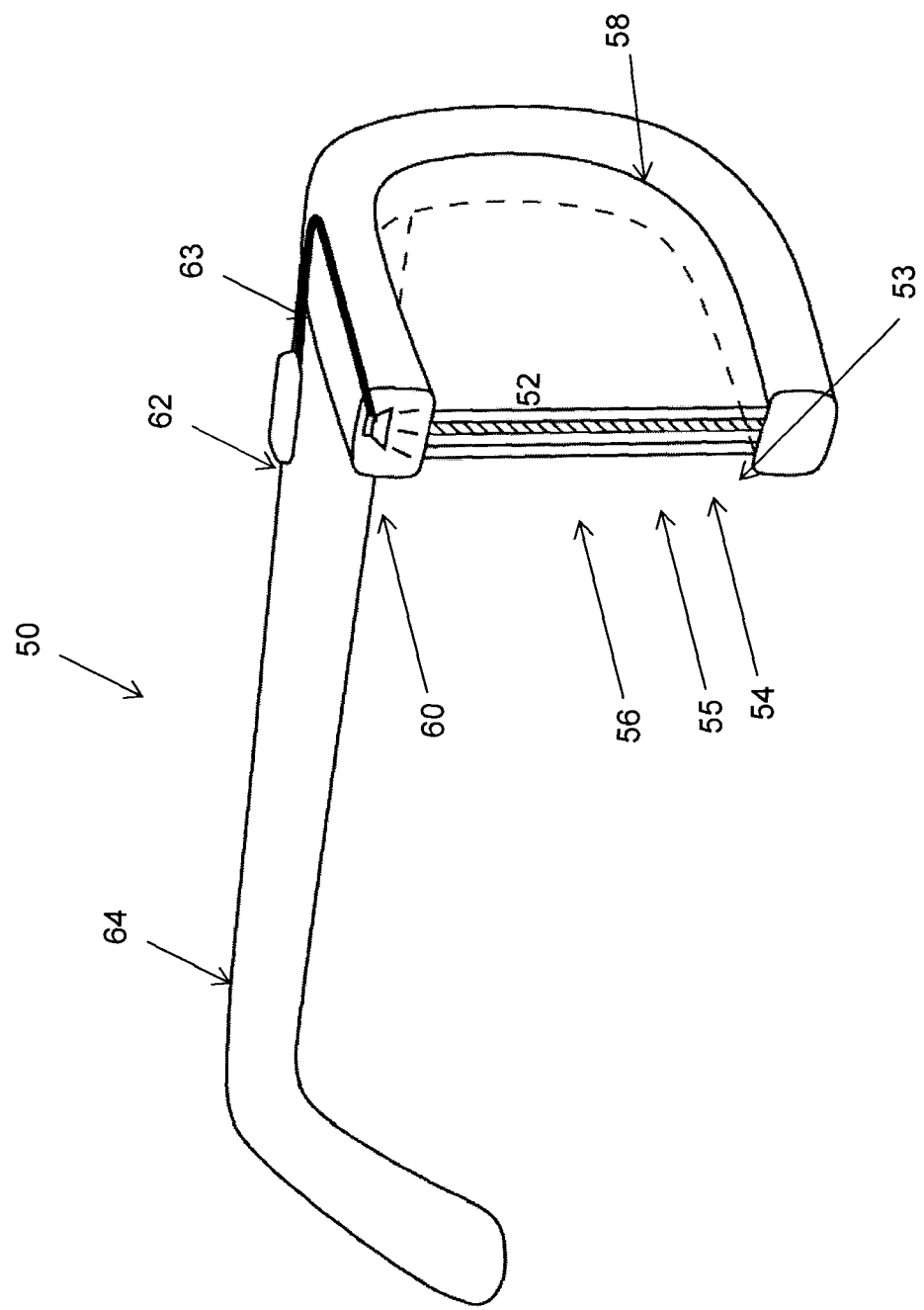
FIG. 7a, b show sectional views of an apparatus (photochromic eyewear with light source) according to further embodiments.

Referring to FIG. 7a, an apparatus (photochromic eyewear comprising components for controllable darkening) according to another embodiment is shown generally at 50. An optical filter comprising a substrate 53 with surface 52, a layer of switching material 54, a light distributing layer 55 and a layer 56 for selectively blocking UV light is affixed to a frame 58—substrate 53 may be a lens. A light source 60 may be embedded within or mounted on the frame 58 to provide light to an edge of the lens, and to the switching material. The light source may be a UV light source, a VIS light source or both a UV and a VIS light source. Light from the light source may be distributed across the switching material (through the lens) via the light distributing layer 55. Where light source 60 provides UV light, UV blocking layer 56 may protect a user's eyes from the light source.

Figure 7B:
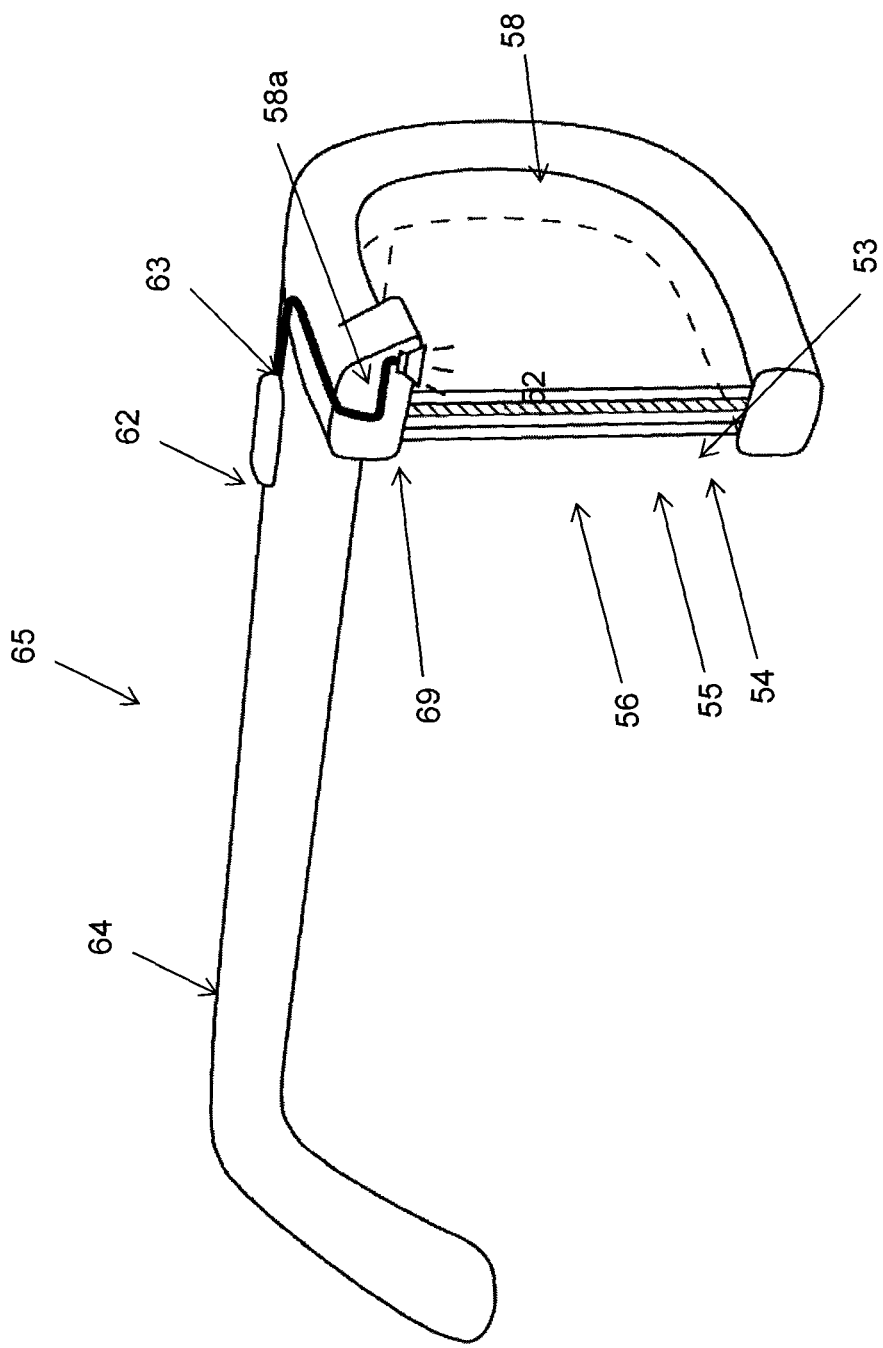

Referring to FIG. 7b, an apparatus according to another embodiment is shown at 65. A light source 69 may be mounted on a front edge 58a of the frame 58; front edge 58a may extend beyond the front plane of the lens 52, and directs a portion of the light from light source 69 to the lens 52 comprising a switching material. In other embodiments, an interior concave surface of front edge 58a may comprise a reflective material applied to a concave surface to further reflect light; light director may comprise a downward directed front edge, which may be straight or curved. In some embodiments, the light source may be directional, such that the light of the light source is directed towards the front plane of the lens. Where light source 69 provides UV light, the front surface of the lens may be configured to transmit light from the light source to the switching material (the front surface of the lens does not block, or at least partially transmits incident UV light) to control darkening of the switching material. In some embodiments a selective UV blocking layer may be applied to the front surface of the lens; the light source 69 may be selected to provide a wavelength or range of wavelength of UV light that is not blocked by a UV blocking layer.

Switch 62 is connected to the light source and a power source (battery, not shown) via electrical connector 63. The switch may be located in any spot convenient for a user—in one embodiment, switch 62 is mounted on an arm 64 of the eyewear. A user may operate the switch to turn a UV light source on to darken the switching material (where the switching material is UV-darkening), and turn the UV light source off when fading of the switching material is desired. In some embodiments where the light source comprises a VIS light source, a switch may be operated to turn on the VIS light source to fade the switching material. Fading may be supplemented by VIS light incident on the lens. In some embodiments, the integrated light source may supplement external light for darkening or fading the switching material. An additional (optional) UV blocking layer may be included on the side of the lens away from the user, to block external UV light and reduce or prevent its influence on the darkening or fading of the switching material. Where this additional UV blocking layer is present, the integrated light source may be the primary, or only, source of stimulus to darken the lens, and the user would have full control over darkening of the lens.

Figure 8:
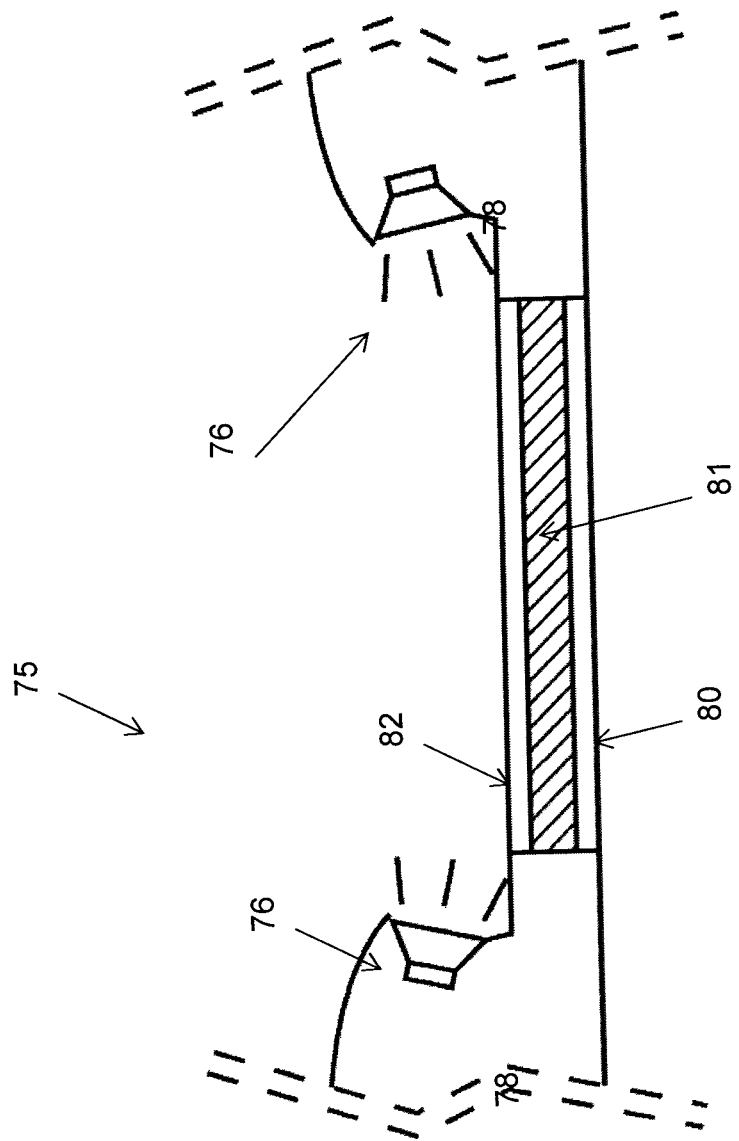
FIG. 8 show sectional views of an apparatus (display) according to another embodiment.

Referring to FIG. 8, an apparatus according to another embodiment is shown generally at 75. A display 80 comprising an optical filter 81 and a top layer 82 may be mounted in a vehicle dashboard 78, or other surface configured for mounting a display. Light from a light source 76 integrated into the dashboard 78 of a vehicle may be directed, or reflected, onto the switching material. Where the display is wide or large, the reflecting portion may facilitate the light reaching all areas of the switching material. In some embodiments, top layer 82 may be colorless, and may further distribute light from the light source across the switching material. In some embodiments, top layer may be tinted and reduce the intensity of the light transmitted from the display. In some embodiments, the top layer may comprise a UV blocking layer; the light source may be selected to provide a wavelength or range of wavelength of UV that is not blocked by the UV blocking layer. The switching material may be darkened with UV light from the light source to dim the display as desired (e.g. when driving at night). The switching material may be faded with VIS light from the light source. A control circuit may control the light source.

Figure 9:
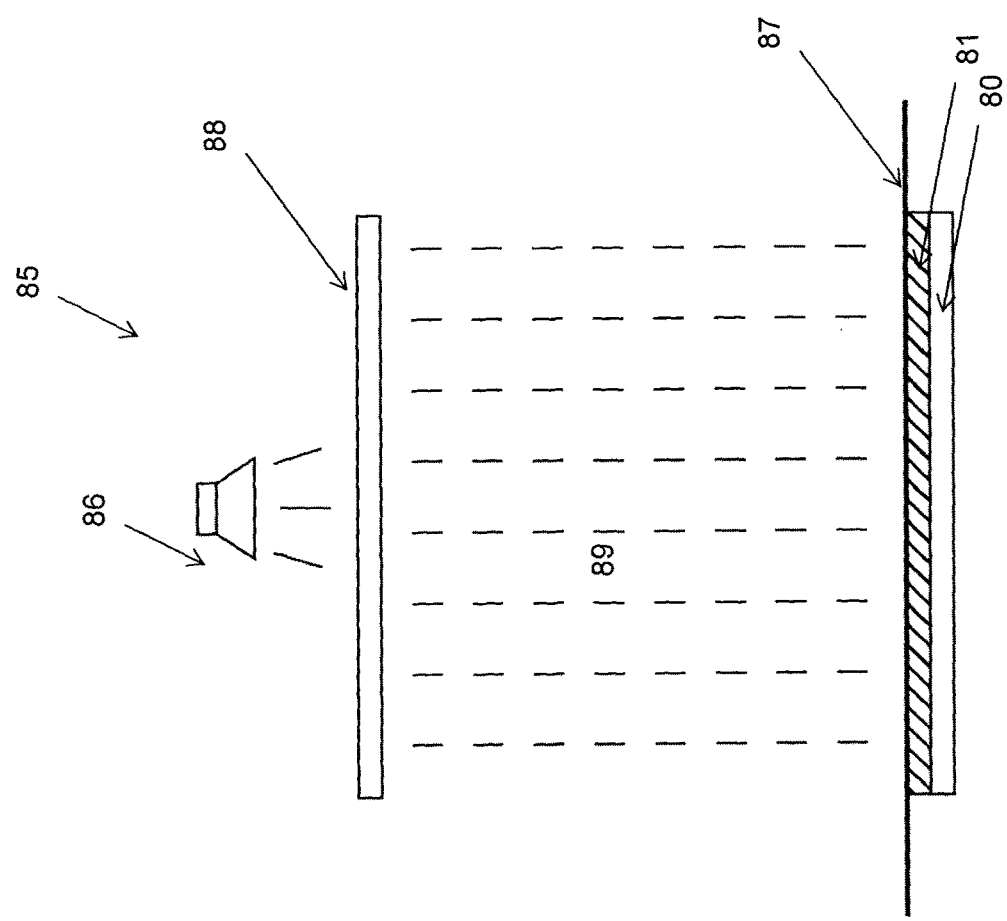
FIG. 9 shows a sectional view of an apparatus (display and remote light source) according to another embodiment.

Referring to FIG. 9, another embodiment is shown generally at 85. Darkening or fading of the switching material in a display may be achieved by using a controllable light source located remotely from the switching material. When light source 86 is on, light passes through a collimating filter 88 and collimated light 89 is directed only to the optical filter 81 of the display 80. The light source may be located in the ceiling or headliner of the vehicle cabin, for example. The collimating filter may focus light on the display, preventing unwanted dispersion of light from the light source through the cabin. Surface 87 may be a tinted layer, or may be a UV or IR blocking layer.

Referring to FIG. 10, another embodiment is shown generally at 90. A display 80 with an optical filter 81 and an adhesive layer 82 may be mounted on a panel or glazing, or other surface configured for mounting a display. In the embodiment shown in FIG. 10, the display and optical filter are undermounted with adhesive 82 to a glass panel 83; panel 83 may be tinted or clear glass, and may be configured for an inset mount in a dashboard or under a table, or the like. The display 80 is backlit by light array 91 comprising first 92 and second 94 light sources providing first and second types of light. In some embodiments the first light source 92 is a UV light source, and the second light source 94 is a VIS light source. Second light source 94 provides, in addition to back-lighting for the display, a source of VIS light for fading the switching material 81. Top layer 82 may be a UV blocking layer, separating the interior of the vehicle from the UV light of first light 92. The display with light source, switching material and top layer may be installed in the dashboard (flush-mounted or under-mounted). Darkening of the switching material is fully controlled through the integrated light source 91.

Where a user desires the display to be turned off, the switching material may be transitioned into a dark state by turning on light source 92 and exposing the switching material to UV light, darkening the switching material. Where the switching material comprises a bistable compound (stable in the dark or faded state configuration, in the absence of electrical or light stimulation), UV light may need to be applied for only a short period of time (e.g. from one to a few minutes) to darken the material, and may then be switched off, thus saving power. A UV blocking top layer prevents UV light from escaping the display, thus protecting a user from exposure to UV light.

Referring to FIG. 11 an apparatus according to another embodiment is shown generally at 100. In this example, the optical filter 81 may be laminated between layers of glass or transparent plastic 102a, 102b with adhesive polymer interlayer(s) 104a, 104b, providing a switchable glazing. The switchable glazing may be used in, for example, architectural or vehicle installations. In some embodiments the switchable glazing may be used in an automotive sunroof. To transition the switchable material from a faded to a dark state, UV light may be provided by light source 110 at one or more edges. Light source 110 may be turned on or off as desired to controllably darken the switchable glazing, using a switch; the switch may be integrated with, or independent of, the vehicle electronics. The apparatus further comprises a light distributing layer 112 to direct light from the edge light source to the switching material. In the illustrated embodiment, the glazing may be darkened by exposure to external UV light, however where suitable external UV light is unavailable, the glazing may be darkened as described, thereby giving the user control over the darkening function. For mounting in a vehicle as a sunroof, the apparatus may be held in position against overhangs 105a, 105b at a first edge by fasteners (not shown) along the bottom edge 106 of the apparatus. Light sources 110 may be mounted in the roof 108 and connected to the vehicle power supply by control circuitry (not shown).

If darkening from external light is not desirable, layer 102a may be configured with a UV blocking layer. In another embodiment, one or both of the transparent adhesive interlayers may be, or comprise, a UV blocking material (a UV blocking layer)

Figure 12:
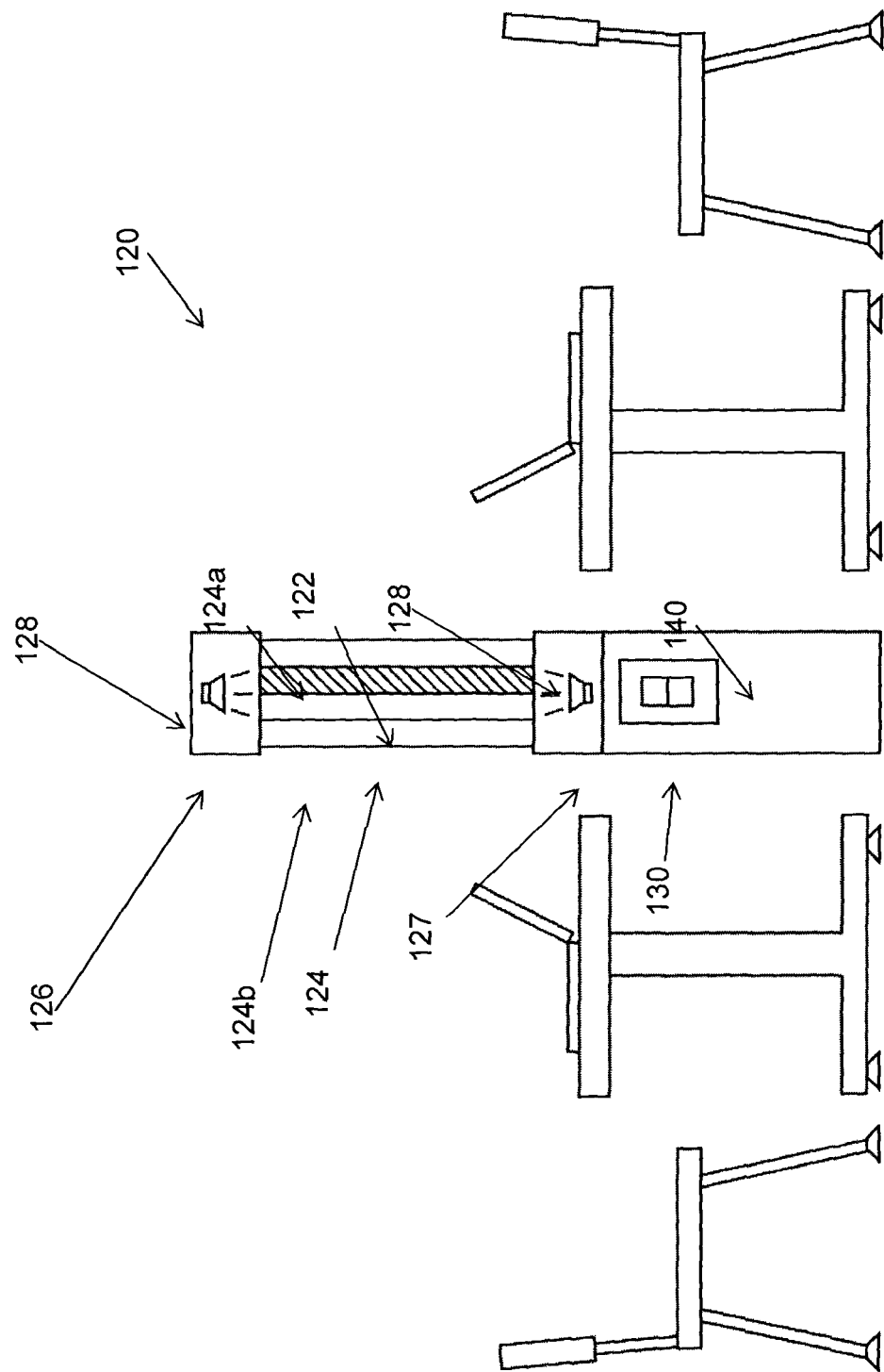
FIG. 12 shows a sectional view of an apparatus (architectural installation) according to another embodiment.

Referring to FIG. 12, an apparatus according to another embodiment is shown generally at 120. A partition comprising a switchable material may be used to divide work spaces or cubicles, or form part of an interior wall, to give persons on either side a controllable privacy glass. An optical filter 122 and a light distributing layer 124 are flanked by UV blocking layers 124a, b. In some embodiments, a UV blocking layer may be a layer of one or more adhesive polymers and the optical filter and light distributing layers 'sandwiched' between layers of glass or transparent plastic with the adhesive polymer. Light sources 126, 127 inside a housing 128 along opposing sides of the layers are shown; light sources may extend along other sides of the layers (not shown). The housing may form top and bottom bounds to the switching region of the partition, or may also form side bounds (thus surrounding the switchable portion as a frame), with a non-switchable portion 140 below, the non-switchcable portion may be transparent, or not. To provide controlled darkening of the switching material, light distributing layer 124 directs light from edge light sources through the glazing and to the switching material. Light sources may be controlled by a switch 130. UV blocking layers constrain the UV light from the light sources within the glazing—this protects a user from exposure to the UV light, and may also block ingress of external UV light (e.g. from a window), preventing passive darkening of the glazing. Where it is desired to fade the glazing, the optical filter material may be exposed to VIS light from a light source along an edge, or where the switching material is photochromic/electrochromic, fading may be effected by application of electricity.

A "light source" is a source of VIS, UV and/or infrared light (IR). A light source may also provide full spectrum light. Light sources may include natural or simulated sunlight (direct or indirect), or light from a selected wavelength or range of wavelengths. The selected wavelength or range of wavelengths may be selected by the nature of the light source itself (e.g. LED, a lamp that produces light in a particular range such as a UV lamp, xenon-arc lamp, low-pressure sodium lamp, or may be selected through use of a cutoff filter, designed to eliminate light, or a percentage of light of a wavelength above or below a cutoff wavelength, or between two cutoff wavelengths. In some embodiments, the light source may include one or more LEDs. In some embodiments of the invention, the light source may be configured to provide light above or below a predetermined wavelength, or may provide light within a predetermined range. A light source may be used in combination with a filter, to selectively transmit or block light of a selected wavelength from the light source, thereby controlling the light that may be applied to the switching material of the optical filter. A light source may be connected to a power source by one or more electrical connectors; an array of light sources may be connected to a power source in series or in parallel. A power source may be a battery, or a vehicle electrical system or a building electrical system. The light source may be connected to a power source via control electronics (control circuit); control electronics may comprise one or more switches. The one or more switches may be automated, or controlled by a sensor, timer or other input, or may be controlled by a user, or a combination thereof. For example, a user may operate a switch to turn on a UV light source to darken a UV-darkening switching material; the light source may be applied on a constant basis until it is turned off, or it may be pulsed (repeated on/off cycles) until it is turned off. Similarly, a VIS light source may be turned on to fade a VIS fading switching material. In other embodiments, a user may operate a switch to turn on a light source, and the light source remains on, or pulses, and the light transmittance of the optical filter may be monitored by a light sensor. When a suitable light transmittance state is attained, the sensor operates a switch in the control circuit to turn the light source off. In some embodiments, the light source may be switched from a continuously-on state to a pulsed state, or vice versa. In some embodiments, fading or darkening may be supplemented by VIS light incident on the optical filter (e.g. supplement fading for a VIS-light fading material, supplement darkening for a VIS-darkening material).

In some embodiments, it may be preferable to prevent egress of light (for example UV light) from the optical filter—a UV blocking layer may be included on a side of the optical filter, or apparatus. The UV blocking layer may also, or alternately, prevent ingress of external UV light, and reduce or prevent its influence on the darkening or fading of the switching material. Where this additional UV blocking layer is present, an integrated light source (back-lit, or along an edge, or both) may be a primary, or only, source of stimulus to darken the lens, and the user would have full control over darkening of the lens. In some embodiments, a first and a second light source may be coupled by a control circuit, such that when the first light source is off, the second light source is on, and vice versa.

In some embodiments, there may be a single layer of switching material comprising two or more switching compounds that are switchable in the same switching material (e.g. soluble in the same matrix). In some embodiments, the optical filter may be adjacent to a surface of a display, and may be fastened by an adhesive layer, an encapsulating layer. In other embodiments, the optical filter may be spaced apart from a surface of the display by a suitable distance. The distance may be maintained by one or more spacer elements. The distance or space may accommodate an air gap. In some embodiments, the distance may be maintained by a clear material such as a polymer or adhesive layer. The air gap and spacer elements may be configured to accommodate air movement between the display and switchable optical filter.

In some embodiments where the switching material is a photochromic/electrochromic material, where full control may be achieved even in the absence of a UV blocking layer preventing incident UV light from darkening the switching material. Darkening of the switching material may be accomplished by operation of a UV light source, incident UV light or both. Fading may be accomplished by operation of a switch with a second setting, or operation of a second switch, that applies electricity to the switching material, or both. For such an embodiment, the switching material is in contact with first and second electrodes (for conduction of electricity from a power source through the switching material), and a user has full control over the light transmissibility of the switching material (or lens, display or glass comprising the switching material), regardless of whether UV light is available or not from an external source.

For embodiments comprising a UV light source, a UV blocking layer may be placed between a source of UV light and a user, to prevent exposure of a user to UV light, and/or to prevent switching of the film or article in response to an external light source, when such switching is undesirable.

"Visible light" (VIS) generally refers to the band of electro-magnetic radiation with a wavelength from about 400 nm to about 750 nm. "Ultraviolet (UV) light" generally refers to electromagnetic radiation with a wavelength shorter than that of visible light, or from about 10 nm to about 400 nm range. In some embodiments, there may be overlap in the general ranges of VIS and UV light, and UV light may be considered to include light with a wavelength up to about 420 nm. In some embodiments, sub-ranges of ultraviolet light may be used, and/or may overlap with light in the visible range, for example from about 100 to about 420 nm, or from about 200 to about 420 nm, or from about 300 to about 420 nm, or from about 350 to about 420 nm. "Infrared light" or infrared radiation (IR) refers to electromagnetic radiation with a wavelength greater than the VIS range, or from about 750 nm to about 50,000 nm. Light may also be described with reference to colour or range of wavelength. Light from a light source may be from about 350 to about 750 nm, or any amount or range therebetween, for example from about 350 nm to about 360, 370, 380, 390, 400, 410, 420, 430 or about 450 nm, or any amount or range therebetween. In other embodiments, light from a light source may be from about 550 to about 700 nm, or any amount or range therebetween, for example from about 550 to about 560, 570, 580, 590, 600, 610, 620, 630, 640, 650, 660, 670, 680, 690 or about 700 nm, or any amount or range therebetween.

Optical filters according to various embodiments of the invention may be described with reference to clarity or haze, translucency, transparency or opacity, light transmittance (LT), switching speed, durability, photostability, contrast ratio, state of light transmittance (e.g. dark state or light state) to further define the device or apparatus, or aspects of the device or apparatus; some values or characteristics of such descriptors may be applicable to some or all devices, but only exemplified in one type of device; alternately, some values or characteristics of such descriptors may be applicable to only a few types of devices.

"Light transmittance" (LT) refers to the quantity of light that is transmitted or passes through an optical filter, or device or apparatus comprising same. LT may be expressed with reference to a change in light transmission and/or a particular type of light or wavelength of light (e.g. from about 10% visible light transmission (LT) to about 90% LT, or the like). An object with a higher LT transmits more visible light. LT is expressed as a number or range between 0 and 1, or as a percentage (0 to 100). LT may alternately be expressed as absorbance, and may optionally include reference to one or more wavelengths that are absorbed. According to some embodiments, an optical filter may be selected, or configured to have in the dark state, a LT of less than 80%, or less than 70%, or less than 60%, or less than 50%, or less than 40%, or less than 30%, or less than 20% or less than 10%, or any amount or range therebetween. According to some embodiments, an optical filter may be selected, or configured to have in the light state, a LT of greater than 80%, or greater than 70%, or greater than 60%, or greater than 50%, or greater than 40%, or greater than 30%, or greater than 20% or greater than 10%, or any amount or range therebetween. According to some embodiments an optical filter may have a LT of less than 1% in the dark state, and have a LT of about 5 to about 50% in the faded state, or any amount or range therebetween. According to some embodiments, an optical filter may have a LT of from about 2% to about 10% in the dark state, and a LT of from about 5% to about 30% in the faded state, or any amounts or ranges therebetween. The LT of each of the optical filters may independently be 1, 2, 3, 4, 5, 6, 7, 8, 9, 10, 12, 14, 16, 18, 20, 25, 30, 35, 40, 45, 50, 55, 60, 65, 70, 75, 80, 85, 90 or 95%, or any amount or range therebetween, with the proviso that the dark state of an optical filter has lesser LT than the light state of the same optical filter. For an apparatus comprising two or more optical filters, or two or more layers of switching material, the LT of the individual optical filters or layers of switching material may be additive to provide the LT of the optical filter. LT may be measured as an average light transmittance across a visible range (VLT) or may be weighted Light Transmittance (Illuminant A) or $LT_A$.

A switching material may darken, or reach a dark state when exposed to light of a first wavelength, and may fade, or reach a faded state when exposed to light of a second wavelength. In some embodiments a switching material may fade when a voltage is applied. In some embodiments, the switching material may fade upon exposure to selected wavelengths of VIS light and darken upon exposure to selected wavelengths of UV light. Dark state and faded state may be described relative to each other.

Contrast ratio is a ratio of the LT of an optical filter in the faded state and the dark state. For example, an optical filter may allow transmission of about 10% of the visible light (~10% LT) in a dark state, and about 60% of the visible light (~60% LT) in a faded state, providing a contrast ratio of about 6 (6:1). According to various embodiments of the invention, a switching material may have a contrast ratio of from about 2 to about 1000 or more, or any amount or range therebetween.

Clarity may be affected by haze due to cloudiness caused by scattering of light. Light may be scattered by particles that are suspended in the substance. Haze may be measured by methods known in the art, for example, using a "hazemeter" (e.g. XL-211 Hazegard, BYK Gardner), according to known and/or standardized methods. Optionally, the haze of an optical filter according to various embodiments is between about 0% and about 5%. In some embodiments of the invention, the optical filter has a haze transmission of about 5% or less, about 3% or less, about 2% or less, about 1.5% or less, or about 1% or less, or from 0-5%, 0.5 to 3% or the like.

"Switching time" ("switching speed") refers to the time necessary for an optical filter to transition from a dark state to a clear state, or from a clear state to a dark state, or to alter light transmission by a defined amount (e.g. 60% to 10% LT in 5 minutes). An optical filter according to various embodiments of the present invention will have a darkening time of between about 1 second and 5 minutes to reach about 10% of the LT of the dark state from the lightened state, and a lightening time of between about 1 second and 5 m minutes to reach about 90% of the LT of the light state from the darkened state. In some embodiments of the invention, the darkening time and lightening time of an optical filter are independently about 1 to about 30 seconds, to about 1, 2, 3, 4 or 5 minutes, or any amount of time or range therebetween.

The term "mil" as used herein, refers to the unit of length for $\frac{1}{1000}$ of an inch (0.001). One (1) mil is about 25 microns; such dimensions may be used to describe the thickness of an optical filter or components of an optical filter, according to some embodiments of the invention. One of skill in the art is able to interconvert a dimension in 'mil' to microns, and vice versa.

As used herein, the term "about" refers to a +/−20% variation from the nominal value. It is to be understood that such a variation is always included in a given value provided herein, whether or not it is specifically referred to.

Substrate

A substrate provides sufficient structural integrity to support the switching material. The substrate may be optically clear, or translucent or opaque; the substrate may be tinted or untinted. Where the substrate is tinted, it may have a light absorbance profile in the VIS range that is complementary to that of the switching material, the combination of tinted substrate and switching material may, in the dark state, block all, or substantially all, light in the VIS range. The substrate may be rigid or flexible—an optical filter comprising flexible substrate(s) may be in the form of a film that may be applied to a rigid material, such as a pane of a window, or a lens. One or more substrates of an optical filter may be made of any suitable material independently selected from a group comprising glass or plastic. Glass includes float glass, tempered glass, laminated glass, tinted glass, mirrored glass, reinforced glass, monolithic glass, multilayered glass, safety glass, bullet-resistant glass or "one-way" bullet-resistance glass. Plastics include polyesters (PE), polycarbonates, polyamides, polyurethanes, polyacrylonitriles, polyacrylacids, (e.g. poly(methacrylic acid), including polyethylene terephthalate (PET), polyolefins (PO) or copolymers or heteropolymers of any one or more of the above, or copolymers or blends of any one or more of the above with poly(siloxane)s, poly(phosphazenes)s, or latex. Examples of polyesters include homopolymers or copolymers of aliphatic, semi-aromatic or aromatic monomeric units, for example polycondensed 4-hydroxybenzoic acid and 6-hydroxynapthalene-2-carboxylic acid (VECTRAN™), polyethylene napthalate (PEN), polytrimethylene terephthalate (PTT), polybutylene terephthalate (PBT), polyethylene terephthalate (PET), polyhydroxyalkanoate (PHA), polyethylene adipate (PEA), polycaprolactone (PCL) polylactic acid (PLA), polyglycolic acid (PGA) or the like. Examples of polycarbonates include bisphenol A, polycarbonate or the like. Other plastics include polyethene (PE), polypropylene (PP) and the like. The substrate may, in some embodiments, have UV, IR or VIS light blocking characteristics, or comprise a UV, IR or VIS light blocking agent or component. Other substrate materials include ceramic spinel or aluminum oxynitride.

The substrate may be of uniform or varying thickness, and of any suitable dimension to provide sufficient structural integrity to support the switching material; determination of a suitable material and thickness is within the ability of one of skill in the art. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of the first substrate differs from the thickness and/or material of the second substrate.

Switching Material

A switching material is transitionable from a light state to a dark state on exposure to light of a first wavelength, or range of wavelengths, and from a dark state to a light state with application of a voltage, or on exposure to visible light of a second wavelength or range of wavelengths. A first range of wavelengths (including light of a first wavelength) includes light of from about 350 nm to about 420 nm, or any amount or range therebetween. A second range of wavelengths (including light of a second wavelength) includes light of about 450 nm to about 690 nm, or any amount or range therebetween. A switching material may further comprise one or more compounds having both photochromic and electrochromic properties. The switching material may be optically clear. In some embodiments, the switching material may be a liquid, a solid, a semi-solid, a sol-gel or a gel. The liquid, sol-gel or gel may be of a range of viscosity.

The thickness of the layer of switching material may affect the light transmittance of the composite optical filter. For example, when comparing a thinner and a thicker layer of the same switching material, the thicker layer may provide a darker state (lower light transmission) Thickness may be uniform or non-uniform. Within a composite optical filter, first, second and/or subsequent layers of switching material may be of the same or different thicknesses. Thickness of a switching material may be from about 0.5 mil to about 10 mil, or any amount or range therebetween, for example, 0.5, 1, 1.5, 2, 2.5, 3, 3.5, 4, 4.5, 5, 5.5, 6, 6.5, 7, 7.5, 8, 8.5, 9, 9.5 or 10 mil, or any amount or range therebetween.

The switching material may comprise one or more compounds (chromophores) and one or more solvents. Chromophores may include diarylethenes, dithienylethenes, fulgides, hexatrienes, cyclopentadienes, azobenzenes, spiropyrans, spirooxazines, polymers comprising one or more of such organic molecules, conjugated polymers, metal oxides (e.g. $WO_3$, $TiO_2$ or the like), or the like. Other examples of compounds include the molecules and polymers described in WO02/06361, WO2004/015024, WO2006/125317 and WO2010/142019. Some examples of diarylethene molecules providing various colours in the closed-ring configuration that may be useful in various embodiments of the invention are described in Irie 2010. Proc. Jpn. Acad. Ser B 86:472-483; and Yamaguchi 2010 J Photochem PhotoBiolA 213:141-146.

In some embodiments, the chromophore of a switching material is an organic species having ring-open and ring-closed isoforms (A and B isoforms), and is reversibly interconvertible between isoforms with application of light and/or voltage, respectively.

In some embodiments, the switching material may comprise one or more additional components. Additional components include one or more of a supporting electrolyte, a polymer, a charge compensator, a charge carrier, a UV stabilizing agent, a UV blocking agent, a tinting agent, or the like. Some components may be able to fill more than one role in the switching material, for example, certain compounds may self-polymerize and fulfill the role of both dye and polymer (see for example, compounds of WO2004/015024 and PCT/CA2012/000910); some polymers may also have UV blocking capabilities; or the like. Some polymers may be a rheology modifier, a cross-linkable polymer, or both a rheology modifier and a cross-linkable polymer, or both. Conversely, in some embodiments, a given component may be made up of several individual compounds, e.g., the polymer component may be a copolymer comprising different monomeric units.

Chromophores according to various embodiments may be selected from Formula IA/B and Formula II A/B. In some embodiments, Conversion between isomers may be light-induced, or may occur under some oxidative conditions such as electrochemical conditions as a result of application of a voltage, or a combination thereof. One or more chromophores may comprise from about 1% to about 25% (by weight) of the switching material, or any amount or range therebetween, for example, 2, 3, 4, 5, 6, 8, 10, 12, 15, 20 or 24 wt %, or any amount or range therebetween. For switching materials comprising two chromophores, they may be present in about a 1:1 ratio (wt), or from about a 10:1 to about a 1:10 ratio, or any amount or range therebetween.

Each of $R_{6a}$, $R_{6b}$, $R_{6c}$, $R_{7a}$, $R_{7b}$ and $R_{7c}$ may be independently selected from a group comprising one or more of H, halo, alkyl, alkoxy, carbonyl, siloxy, thioalkyl or aryl. The $R_{6a}$ and $R_{7a}$ position may alternately be referred to as the "5 position"; the $R_{6b}$ and $R_{7b}$ position may alternately be referred to as the "4 position"; the $R_{6c}$ and $R_{7c}$ position may alternately be referred to as the "3 position" of the ring;

Each of $R_{9a}$, $R_{9b}$, $R_{9c}$, $R_{9d}$ and $R_{9e}$ may be independently selected from the group consisting of H, halo, alkyl, alkoxy, thioalkyl, carbonyl, siloxy or aryl.

In another aspect, $R_{6a}$ and $R_{6b}$, or $R_{6b}$ and $R_{6c}$ are each —CH═CH— and joined to form an unsaturated ring, In another aspect, $R_{7a}$ and $R_{7b}$, or $R_{7b}$ and $R_{7c}$ are each —CH═CH— and joined to form an unsaturated ring.

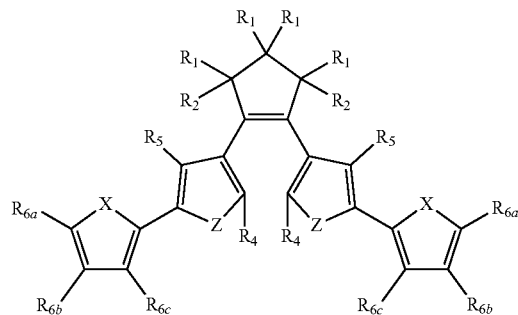

(IA)

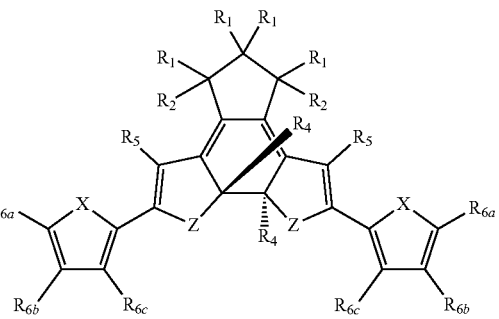

(IB)

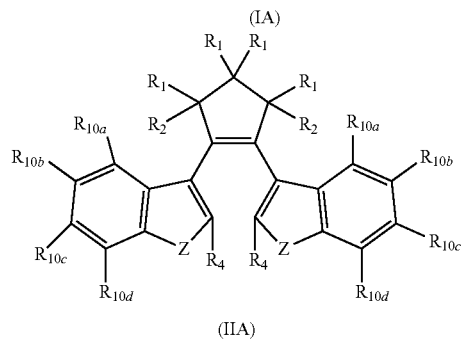

(IIA)

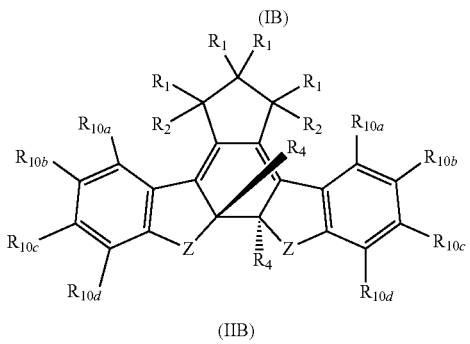

(IIB)

wherein
X may independently be N, O or S;
Z may independently be N, O or S;
Each $R_1$ may be independently selected from the group consisting of H, halo;
Each $R_2$ may be independently selected from the group consisting of H, halo, a polymer backbone, alkyl or aryl; or, when both $R_2$ together form —CH═CH— and form part of a polymer backbone;
Each $R_4$ may be independently selected from the group consisting of

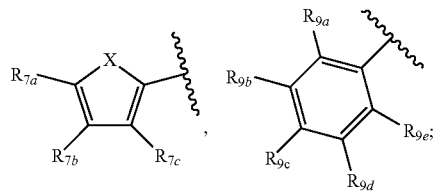

Each $R_5$ may be independently selected from the group consisting of H, halo, alkyl or alkoxy. and;

In another aspect, $R_{9a}$ and $R_{9b}$, or $R_{9b}$ and $R_{9c}$, or $R_{9c}$ and $R_{9d}$, or $R_{9d}$ and $R_{9e}$ are each —CH═CH— and joined to form an unsaturated ring.

In another aspect, $R_{9c}$ may be an alkyl, alkoxy or siloxy group, selected from a group comprising an alkyl group comprising from one to 20 carbons. In another aspect, one or more of $R_{10a}$, $R_{10b}$, $R_{10c}$, $R_{10d}$ may be an alkoxy or siloxy group, comprising from one to ten oxygen atoms and from one to 20 carbons. In another aspect, an $R_{10b}$ and an $R_{10c}$ are each O, and joined with a —CH$_2$— to form a 5 membered ring.

As used herein, "halogen" refers to F, Cl, Br or I. The term "halo" is generic, and refers to any halogen moiety, for example fluoro- chloro-, bromo- or iodo-, or the like.

As used herein, "metal" as used herein refers to a transition metal, or an alkali metal such as Li, Na, K, or the like; or a metalloid such as B or Si, or the like.

As used herein, "alkyl" refers to any linear or branched, non-aromatic monocyclic or polycyclic, substituted or unsubstituted alkyl group of 1 to 50 carbons, for example 2, 3, 4, 5, 6, 7, 8, 9, 10, 11, 12, 13, 14, 15, 16, 17, 18, 19, 20, 25, 30, 35, 40, or 45, or any amount therebetween. Examples of alkyl groups include methyl, ethyl, propyl, isopropyl, butyl, iso-butyl, sec-butyl, tert-butyl, 1-pentyl, iso-pentyl, neo-pentyl, hexyl, cyclopropane, cyclobutane, cyclopentane, cyclohexane or the like. The alkyl group may have one or more saturated or unsaturated bonds. The alkyl group may contain only carbon and hydrogen atoms, or may further incorporate one or more heteroatoms such as Si, N, O or S as part of the alkyl group (a heteroalkyl group). Examples of cyclic heteroalkyl groups include aziridine, oxirane, thiirane, oxaziridine, dioxirane, azetidine, oxetane, thietane, diazetidine, dioxetane, dithietane, azirine, oxirene, thiirene, azete, oxete, thiete, dioxete, dithiete, pyrrolidine, oxolane, thiolane, borolane, silolane, dithiolane, dioxolane, oxazolidine, piperidine, oxane, thiane, piperazine, morpholine or the like. An alkyl group with a Si heteroatom may be described as a 'silyl' or silane' group.

As used herein, "alkoxy" refers to any —O—R group, where R (and R' for an ether, below) may independently be H, alkyl, siloxy or aryl. Examples of alkoxy and siloxy groups include those with from 1 to 50 carbon or silicon atoms in a linear or branched chain, for example methoxy or ethoxy, or longer alkyl groups. Alkoxy groups include ethers (—R—O—R'—), alcohol (—OH) or alkoxide (—R—O-metal) or the like. An alkyl group comprising an alkoxy substituent group may be referred to as an alkylalkoxy' group. An alkyl group comprising an Si heteroatom, and an alkoxy, or a siloxy group may be referred to as an alkylsiloxy, or silylsiloxy group.

As used herein, "carbonyl" includes aldehyde (R—COH), ketone (RCOR'), ester (RCOOR'), acyl (RR'C=O), carboxyl, thioester (COSR'), primary amide (CONH$_2$), secondary amide (CONHR'), tertiary amide (CONR'R") or the like.

R', R", R"' may be alkyl chains that contain between 1 and 50 non-hydrogen atoms such as C, N, O, S, Si, B or P that may be branched or unbranched, that may be acyclic or cyclic, and that may contain any permutation of heteroatomic substituents such as N, O, S, Si, B or halogen.

As used herein, "aryl" refers to a group or substituent derived from an aromatic ring compound where one or more hydrogen atoms are removed from the ring. An aryl group may alternately be referred to as an aromatic group. An aryl group may comprise a single atom species in the ring (e.g. all ring atoms may be carbon, such as in a phenyl ring—a 'carbocycle') or may comprise one or more heteroatoms in the ring—a "heteroaryl". An aryl group may be polycyclic. The carbocyclic, heterocyclic or polycyclic aryl group may comprise one or more substitutent groups (a substituted aryl) or be unsubstituted (an unsubstituted aryl). A carbocyclic aryl group may be substituted or unsubstituted phenyl or the like. A carbocyclic aryl group may be polycyclic.

A heterocyclic aryl group may be substituted or unsubstituted pyrrole, furan, thiophene, imidazole, pyrazole, oxazole, isoxazole, thiazole, isothiazole, triazole, furazan, oxadiazole, thiadiazole, dithiazole, tetrazole, pyridine, pyran, thiopyran, diazine, oxazine, thiazine, dioxine, dithiine, triazine, tetrazine, or the like. A polycyclic aryl group may be substituted or unsubstituted indole, isoindole, quinolone, isoquinoline, benzofuran, benzothiophene, acridine, dibenzothiophene, carbazole, dibenzofuran or the like.

Compounds according to various embodiments of the invention may include one or more of the following:

Each $R_1$, $R_2$ may be independently selected from a group comprising H or F.

Each $R_4$ may each be independently selected from a group comprising one or more than one of thiophenyl, substituted thiophenyl, benzyl, substituted benzyl,

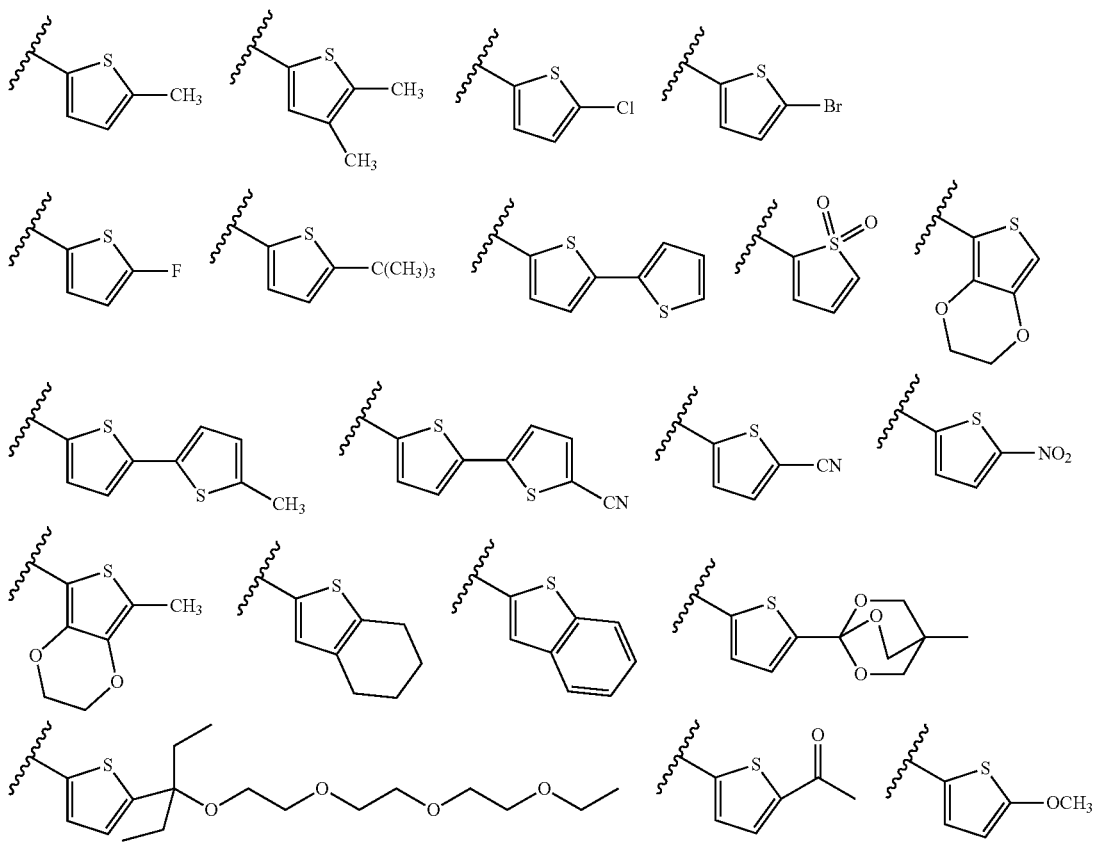

-continued
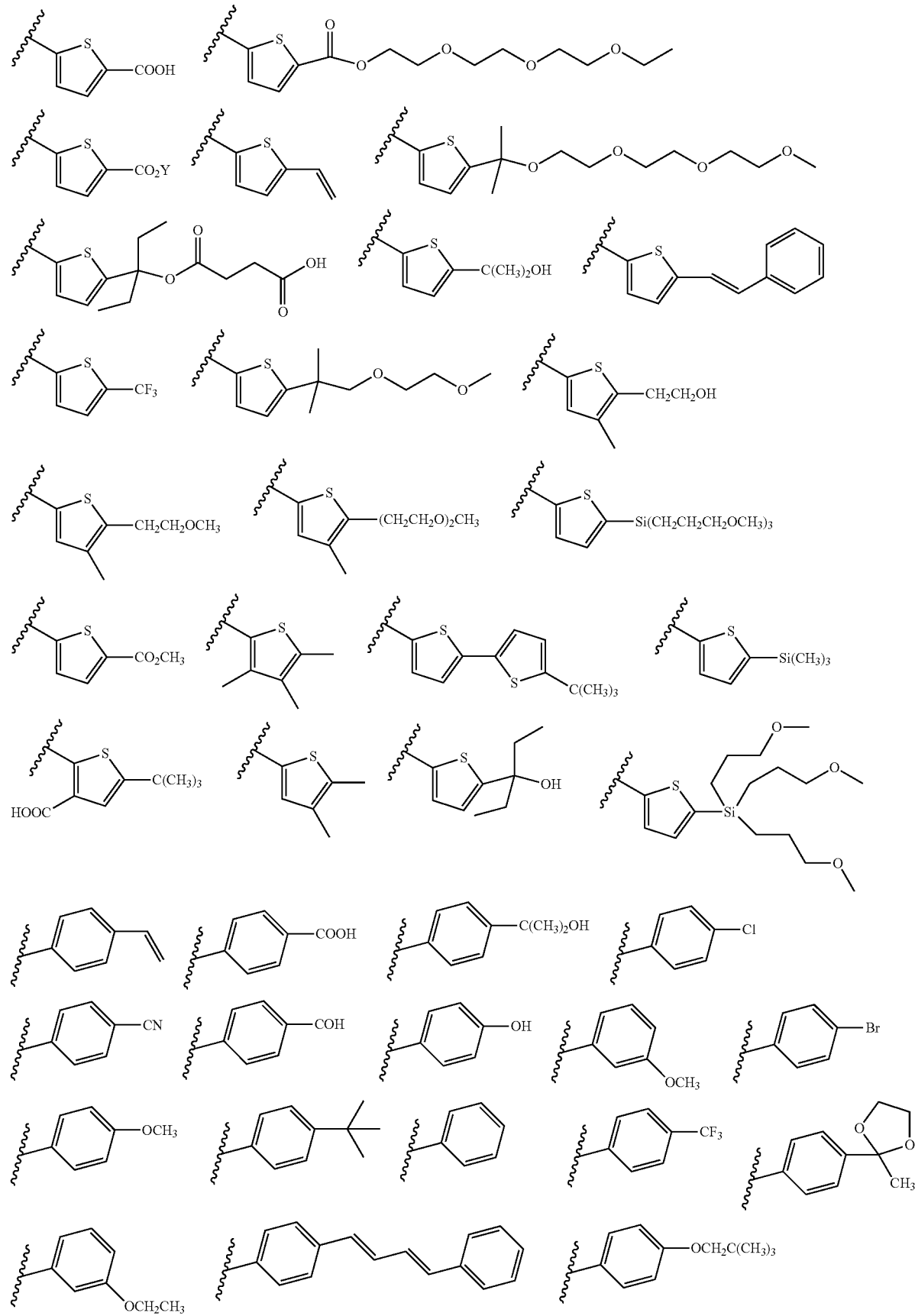

-continued
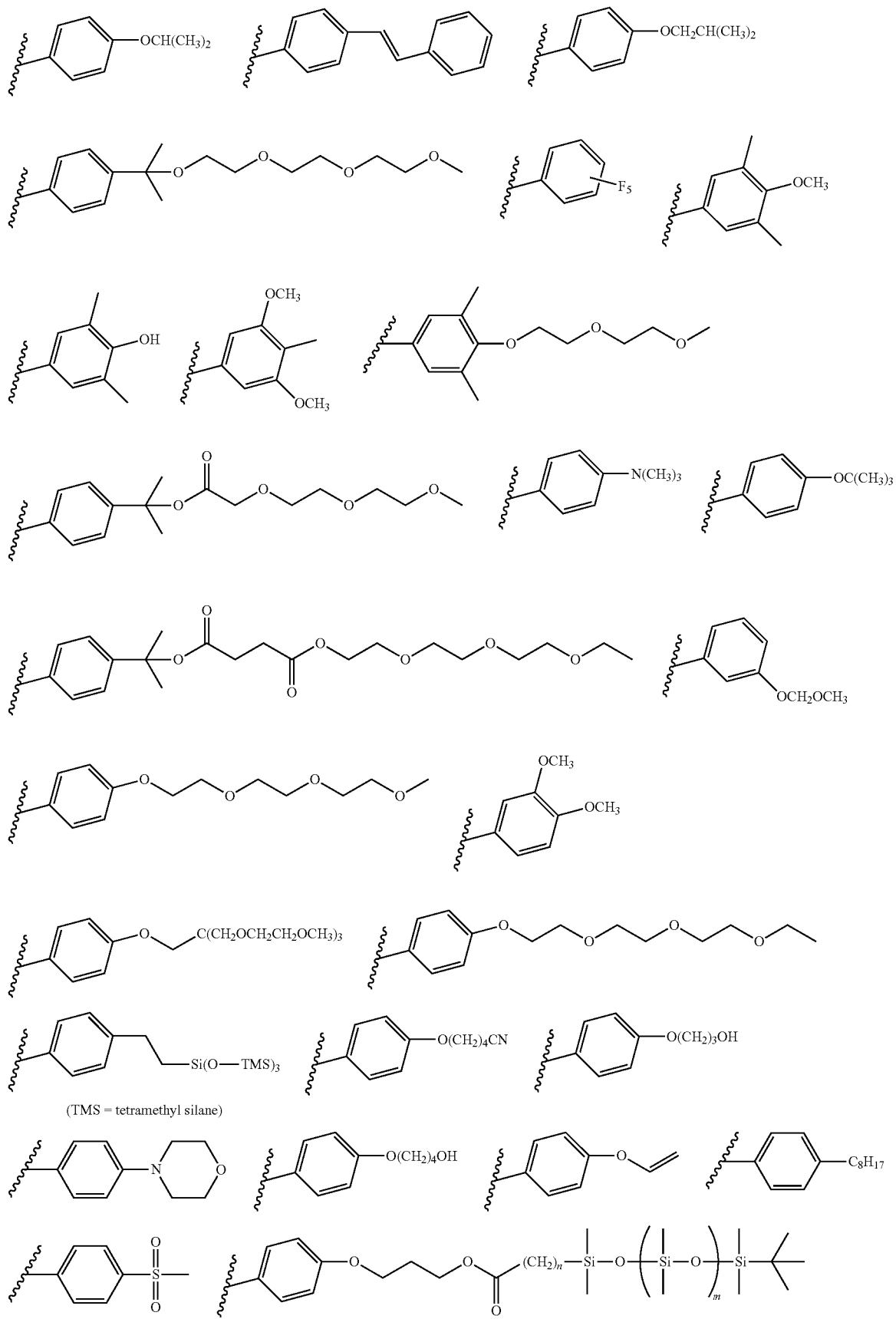
(TMS = tetramethyl silane)

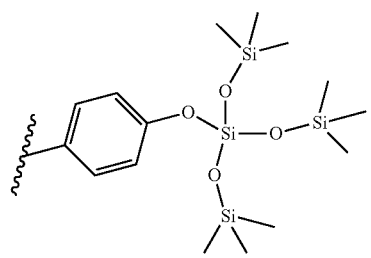
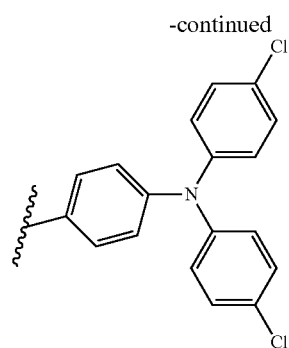
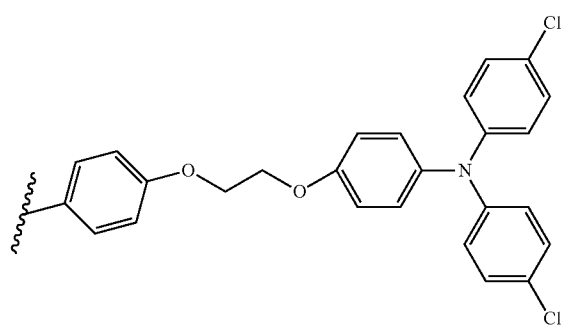

Each $R_5$ may be independently selected from a group comprising: H, methyl, ethyl, propyl, butyl, tert-butyl, thiophenyl, substituted thiophenyl, benzyl, substituted benzyl, —CH=CH—, —CH=CH—, —OCH$_3$, CO$_2$H.

Substituent groups of a substituted thiophene or substituted benzyl group may include —CN, methyl, ethyl, propyl, butyl, tert-butyl.

$R_{6a}$ and $R_{6b}$, or $R_{6b}$ and $R_{6c}$, or $R_{7a}$ and $R_{7b}$, or $R_{7b}$ and $R_{7c}$ may each be a) —CH=CH— and fused to form a ring; or b) —CH$_2$—CH$_2$— and fused to form a ring; or c) —O—CH$_2$— and fused to form a ring;

One or more than one of: $R_{6a}$, $R_{6b}$, $R_{6c}$; and/or $R_{7a}$, $R_{7b}$, $R_{7c}$; and/or $R_{9a}$, $R_{9b}$, $R_{9c}$, $R_{9d}$, $R_{9e}$; and/or $R_{10a}$, $R_{10b}$, $R_{10c}$, $R_{10d}$ may each independently be selected from a group comprising one or more of: H, Cl, Br, F, —CF$_3$, —CN, —NO$_2$, methyl, ethyl, propyl, iso-propyl, butyl, sec-butyl, iso-butyl, tert-butyl, saturated or unsaturated alkyl that is linear or branched with 5-12 carbons, —Si(R$_{11}$)$_3$, thiophene, substituted thiophene, benzyl, substituted benzyl, —CH$_2$—CH$_2$—, —CH=CH—, —CH=CH$_2$, —OCH$_3$, —COH, —OH, —CO$_2$H, —COCH$_3$, —CO$_2$Y, —C(CH$_3$)$_2$OH, —Si(CH$_3$)$_3$, —CH$_2$CH$_2$OCH$_3$, —CH$_2$CH$_2$OH, —N(CH$_3$)$_2$, —CO$_2$CH$_3$, —OCH$_2$OCH$_3$, —SO$_2$CH$_3$, —OCH$_2$C(CH$_3$)$_3$, —OCH$_2$CH(CH$_3$)$_2$, —OC(CH$_3$)$_3$, —OCH=CH$_2$, —O(CH$_2$)$_4$CN, —O(CH$_2$)$_4$OH, —O(CH$_2$)$_3$OH, —C(CH$_3$)$_2$OH, —OCH$_2$)$_2$OCH$_3$,

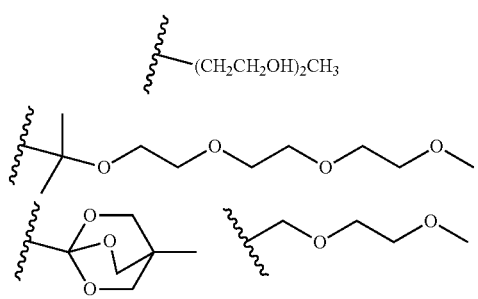

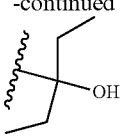
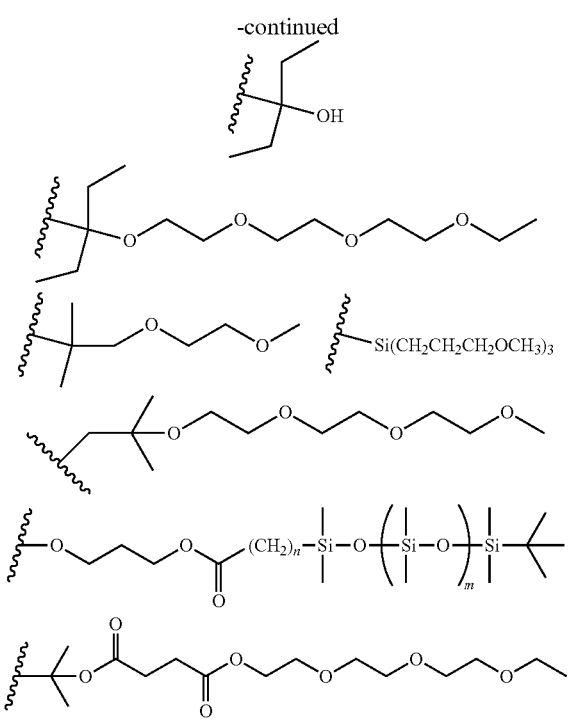
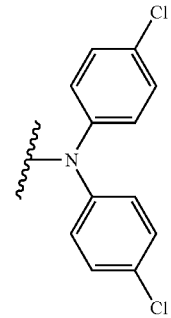

-continued

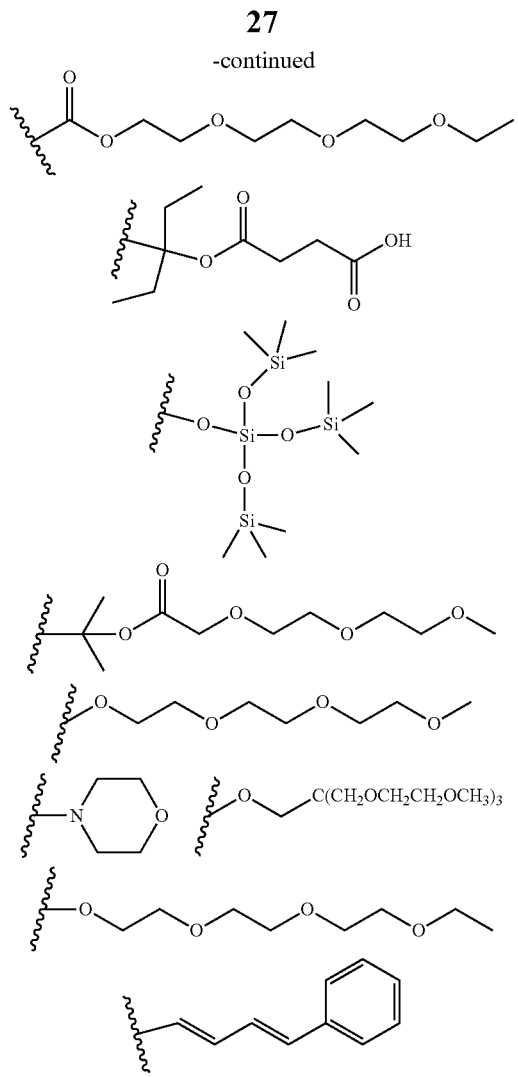

In some embodiments, each $R_{11}$ of —Si($R_{11}$)$_3$ may be independently selected from the group comprising R or —O—R, and wherein R is linear or branched, non-aromatic monocyclic or polycyclic, substituted or unsubstituted alkyl group of 1 to 5, 1 to 10, 1 to 15 or 1 to 20 carbons. In some embodiments, each R may be a heteroalkyl group comprising one or more of O, S, N or Si, or each R may be a saturated or unsaturated alkyl that is linear or branched with 1-12 carbons, or each R may be a substituted or unsubstituted methyl, ethyl, propyl, iso-propyl, butyl, sec-butyl, iso-butyl, tert-butyl, pentyl or hexyl.

In some embodiments, for a compound according to Formula IA and IB, $R_1$ and $R_2$ are H or F, Z and X are each S, $R_4$ may be

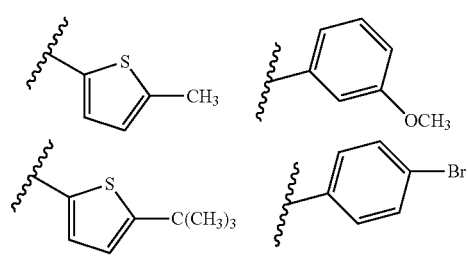

-continued

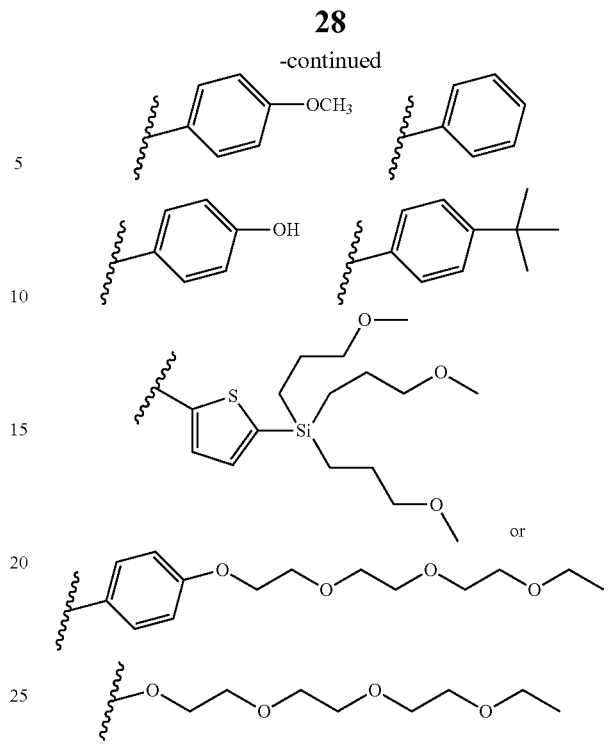

and $R_{6a}$, $R_{6b}$, and $R_{6d}$ may independently be —OCH$_3$, H, —C(CH$_3$)$_3$ or —Si(R$_{11}$)$_3$, In some embodiments, for a compound according to Formula IIA and IIB, $R_1$ and $R_2$ are H or F, Z is O, $R_{10a}$, $R_{10b}$, $R_{10c}$ and $R_{10d}$ may independently be —OCH$_3$, H, —C(CH$_3$)$_3$

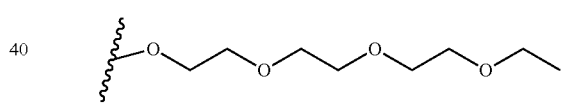

and $R_4$ may be

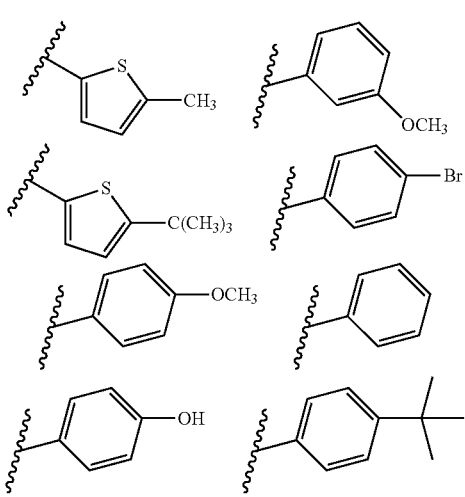

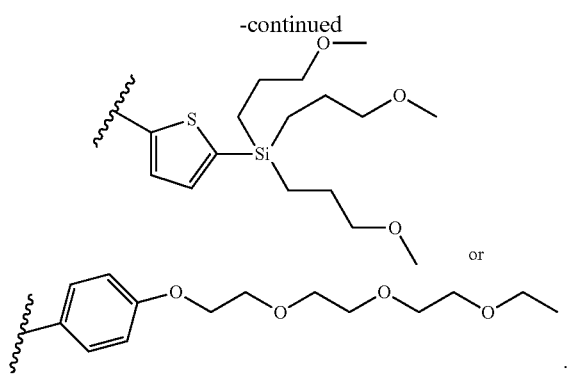

In some embodiments, for a compound according to Formula IIA and IIB, where $R_1$ and $R_2$ are F and Z is O and all of $R_{10a}$, $R_{10b}$, $R_{10c}$ and $R_{10d}$ are H, $R_{9c}$ is not an alkyl chain according to $C_4H_9$, $C_8H_{17}$ or $C_{12}H_{25}$.

Examples of chromophores according to Formula IAB and Formula IIA/B are shown below. Synthetic schema, photostationary state and sensitivity index for these and other chromophores according to Formula IAB and Formula IIA/B are described in commonly owned PCT Application PCT/CA2012/000910. The open-ring isoform (isoform A) is illustrated, and conditions to open and close the rings of the appropriate isoform are indicated herein (e.g. exposure to light, or application of voltage).

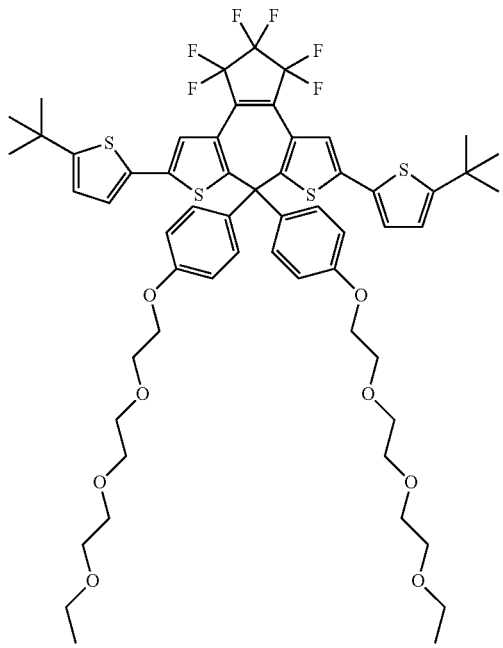

S109

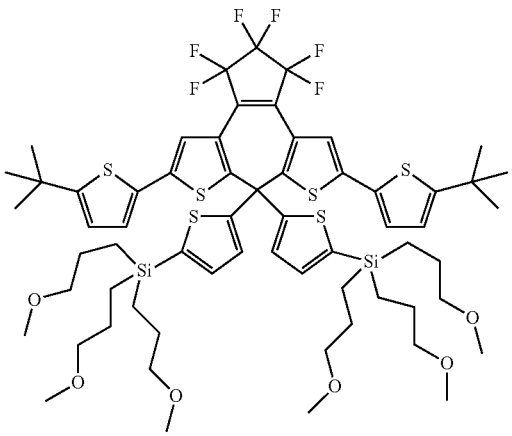

S158

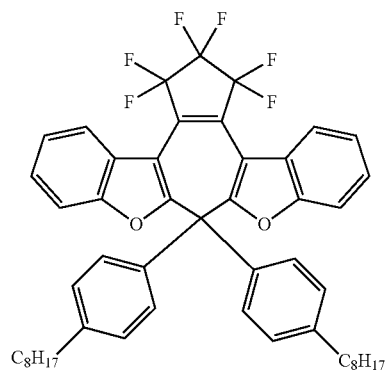

S079

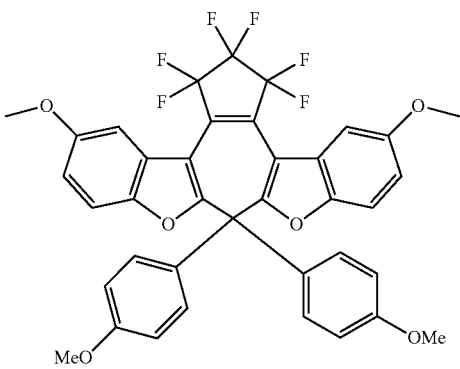

S083

-continued
S137
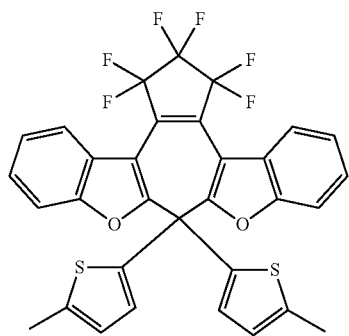
S140
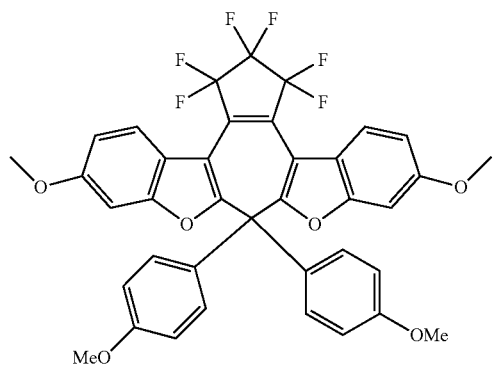
S144
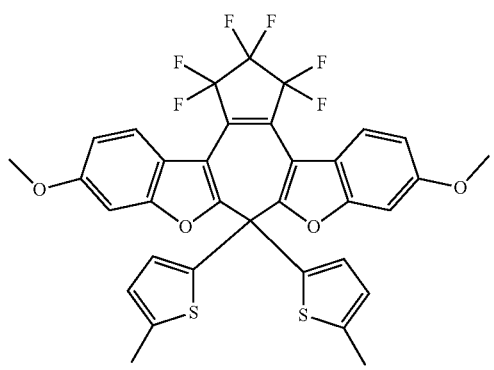
S151
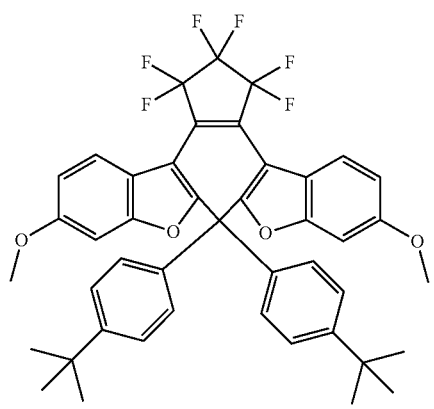
S155
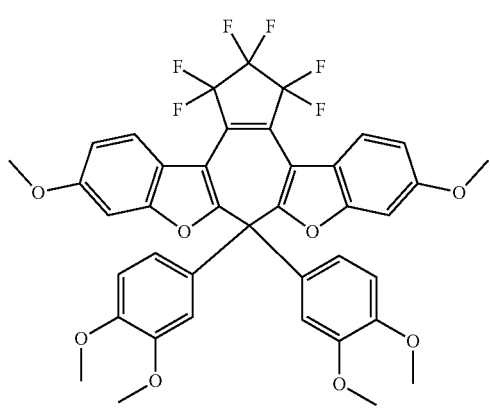

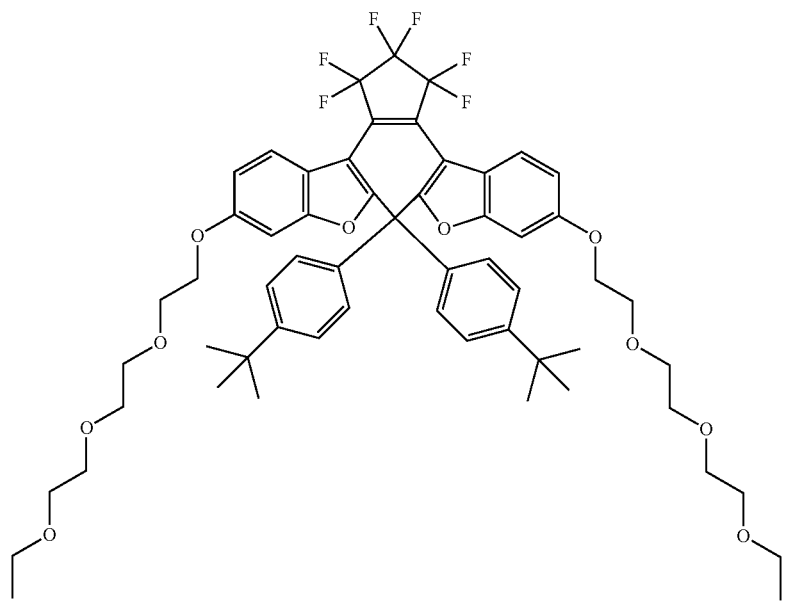

S161

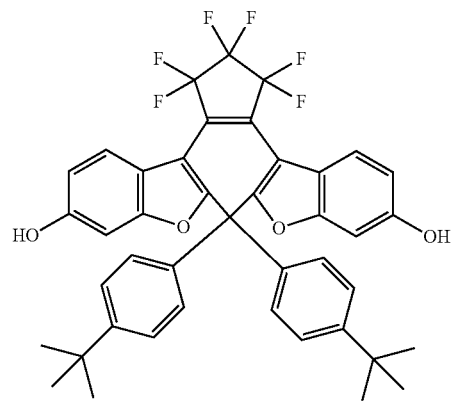

S162

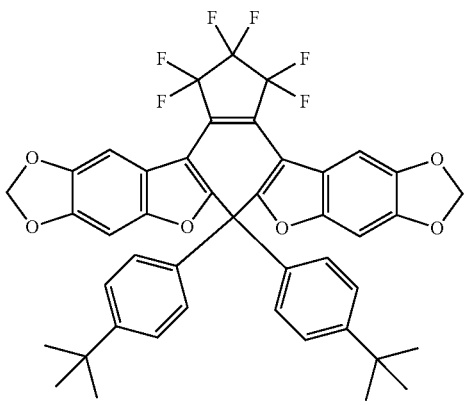

S163

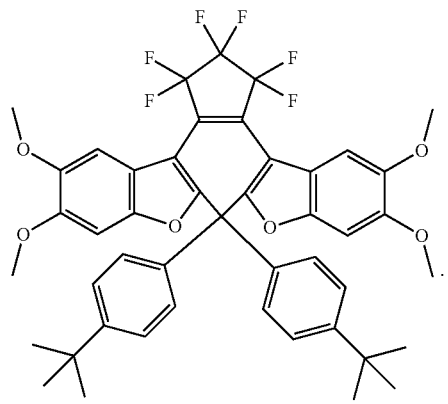

S164

Combinations of chromophores for inclusion in switching materials of an optical filter according to various embodiments of the invention may be selected to provide a particular LT range and/or particular colour of the optical filter in a dark or light state.

Solvent: A solvent component of a switching material may have one or more of the following characteristics: boiling point of about 150° C. or greater, vapour pressure of about 0.001 mmHg or less at 20° C., Yellowness Index (YI) of about 6 or less; a flash point of about 80° C. or greater, a melting point of about 40° C. or less, is compatible with components of a switching material or coatable formulation, and does not interfere with darkening or fading of the switching material. The solvent component may be a mixture of one or more than one solvents. Examples of solvents include triglyme, tetraglyme, propylene carbonate, ethylene carbonate, 2-butylene carbonate, delta-valerolactone, formamide, 3-methyl-2-oxazolidone, phthalide, tetramethylurea, dimethyl-2-methyl glutarate, diethyl succinate, triethylene glycol di-2-ethyl butyrate, triethylene glycol bis(2-ethylhexanoate, butyrolactone, cyclopentanone, ethylene glycol phenyl ether; diethylene glycol monobutyl ether, 2(2-butoxyethoxy)ethyl acetate, diethyl adipate, dimethyl adipate, 2,2,4-trimethyl-1,3-pentanediol monoisobutyrate, propylene glycol diacetate, dibutyl itaconate, dimethylglutarate or the like. The one or more solvents may comprise from about 30% to about 90% (wt %) of the switching material, or any amount or range therebetween. In some embodiments, the solvent is optically clear, or substantially optically clear, and the one or more supporting electrolyte, rheology modifiers, gelling agents, polymers, co-solvents, accelerants, hardeners, epoxides and other components of a switching material or composition are soluble in the solvent Supporting Electrolyte: Supporting electrolytes may include alkali metal salts, tetralkylammonium salts or the like. Examples include tetrabutylammonium tetrafluoroborate, tetrabutylammonium hexafluorophosphate, tetrabutylammonium perchlorate, lithium bis(trifluoromethane sulfonimide), tetrabutylammonium bis((trifluoromethyl)sulfonyl)imide, triflate, lithium bis(oxatlato)borate, lithium perchlorate or the like. The one or more electrolytes may be present in an amount from about 0.1% to about 10% (by weight) or any amount or range therebetween, for example 0.5, 0.8, 1, 2, 3, 4, 5, 6, 7, 8, or 9%, or any amount or range therebetween.

Polymer: The switching material may comprise one or more polymers. The one or more polymers may be a rheology modifier, a crosslinkable polymer, or both a rheology modifier and a crosslinkable polymer. A rheology modifier may increase the viscosity of the switching material to facilitate coating of the switching material on a substrate, or into a mold or die. Examples of one or more polymers include polyvinyl alcohol (PVOH), polyvinyl acetate (PVA), polyvinylbutyral (PVB), poly(methyl methacrylate) (PMMA), nitrile rubber (NBR), polyvinylpyrrolidone (PVP), polyvinylidene fluoride (PVDF), poly(dimethylsiloxane) (PDMS), poly(ethyl methacrylate) (PEMA), NBR, hydroxypropyl cellulose, PEG-DMA (poly(ethylene glycol) dimethacrylate), PHEMA (poly(2-hydroxyethyl methacrylate), Plexiglas™ G-UVT acrylic, polychloroprene, polybutadiene, PDMS-g-PEG (PEG-modified PDMS), PEO (polyethylene oxide), PEG-MEMA (PEG-methylether methacrylate), silicones, PDMS, PPGMA (poly(propylene glycol), EGDMA (ethylene glycol dimethacrylate), PVDC (polyvinylidene chloride), PVC (polychlorovinyl), PVDC-PVC, cyclo olefin copolymer (APEL™), carboxymethyl cellulose (CMC), SOLEF™ 21520, SOLEF™ 21508, zein, polyisobytulene-600, poly(ethylene-co-methacrylic acid (EMAA, SURLYN™ 60), polyethylene-co-(ethylacrylate), ethylacrylate, poly(vinylidene chloride-co-vinyl chloride), polyisoprene, polybutene, poly(sodium 4-styrene sulfonate), HEMA (hydroxyethyl)methacrylate or combinations thereof, or copolymers thereof. Cross-linkable polymers comprise one or more pendant —OH groups, and may be a homopolymer or co-polymer. Examples of cross-linkable polymers include PVOH, PVA, PVB and PEO. One or more polymers may be present in an amount of about 0.5 wt % to about 20 wt %, or any amount or range therebetween, for example 1, 2, 3, 4, 5, 6, 7, 8, 9,10, 11, 12, 13, 14, 15, 16, 17, 18, or 19 wt %. Examples of PVB preparations that may be used in compositions or formulations according to various embodiments of the invention include one or more of B60H (Kuraray; MW of about 50-60K), B90 (Butvar, MW of about 70-100 K) and B72 (Butvar, MW of about 170-250 K).

One or more sol-gels may also be included in a switching material; a sol-gel may be a rheology modifier. Examples of sol-gels include silicon-oxygen based sol-gels, aluminum-oxide based sol-gels or combinations thereof. The one or more polymers or sol-gels may be present in an amount from about 0.1% to about 10% (by weight) or any amount or range therebetween, for example 1, 2, 3, 4, 5, 6, 7, 8, or 9%, or any amount or range therebetween.

The switching material may comprise components (hardeners, accelerants, crosslinkers or the like) to facilitate cross-linking of the switching material before, during or after coating on a substrate layer or surface.

Cross-Linker: A cross-linker (cross-linking agent) may comprise two or more reactive groups; reactive groups may independently be, for example, aldehyde, epoxide, isocyanate, silane or the like. Examples of crosslinking agents include aldehyde, isocyanate, melamines, phenolic resins or the like. A hardener may be used with some crosslinking agents comprising an epoxide reactive group. Examples of aldehyde crosslinkers include terephthalaldehyde and the like, Examples of epoxides include DER736, DER732 (both from Dow Chemical), bisphenol A diglycidyl ether (BADGE), 1,4-butanediol diglycidyl ether, 1,4-cyclohexanedimethanol diglycidyl ether, 1,2,5,6-diepoxycyclooctane, resorcinol diglycidyl ether, tris(4-hydroxyphenyl) methane triglycidyl ether or diglycidyl 1,2-cyclohexanedicarboxylate and the like. Examples of isocyanate crosslinking agents include aromatic and aliphatic diisocyanates; examples of aliphatic diisocyanates include hexamethylene diisocyanate (e.g. DESMODUR™ N100, N3300A, N3600), isophorone diisocyanate, methylene dicyclohexyl diisocyanate, xylylene diisocyanate, cyclohexane diisocyanate, tetramethyl xylylene diisocyanate, isopropenyl dimethylbenzyl isocyanate, trimethylhexamethylene diisocyanate, norbornane diisocyanate or the like. Examples of aromatic diisocyanates include diphenylmethane diisocyante, toluene diisocyanate, p-phenylene diisocyanate, naphthalene diisocyanate or the like. The cross linker may be present in a switching material in an amount of about 0.01% to about 10%, or any amount or range therebetween, for example 0.02, 0.04, 0.06, 0.08, 0.1, 0.2, 0.5, 1, 2, 3, 4, 5, 6, 7, 8, or 9 wt %, or any amount or range therebetween.

Hardeners: A hardener (curing agent") may be an anhydride, for example MHHPA (methylhexahydrophthalic anhydride) THPA (tetrahydropthalic anhydride), MTHPA (methyltetrahydropthalic anhydride), HHPA (hexhydropthalic anhydride), 4-methylhexahydrophthalic anhydride or the like. A hardener may be present in a switching material in an amount of about 0.5% to about 10%, or any amount or range therebetween, for example 1, 2, 3, 4, 5, 6, 7, 8, or 9 wt %.

Accelerant: examples of accelerant ("catalyst") used with materials comprising an epoxy reactive group may include AMC-2, AMC-3, ATC-3 (AMPAC Fine Chemicals), Zinc 2-ethyl hexanoate (99%, or 80% in mineral spirits), AC8 (Available from Broadview), CXC1612 or CXC1613 (King Industries), 1,4-diazabicyclo[2.2.2]octane (DABCO), HCl, p-toluenesulfonic acid, potassium t-butoxide, Tyzor ZEC (Dorf-Ketal), Tyzor AA75 (Dorf-Ketal), Titanium tetraisopropoxide, Copper (II) chloride. Where the crosslinker is an aldehyde, the accelerant may be an acid, such as a Lewis acid. Examples of accelerants that may be used with materials comprising an isocyanate reactive group may include dibutyltin dilaurate, dibutyltin diacetate, dibutyltin oxide, transition metal (e.g. Mn, Sn, V, Bi, Zn, Co, Zr, Al, Cr, Ti, Cu) complexes of acetylacetonate, octanoate, chelate (e.g.

metal chelates from King Industries) or the like The accelerant may be present in a switching materialin an amount of about 0.001% to about 1%, or any amount or range therebetween, for example, 0.01, 0.05, 0.1, 0.2, 0.3, 0.4, 0.5, 0.6, 0.7, 0.8 or 0.9 wt %.

Co-Solvent: a co-solvent may be used to dilute a switching material for coating on a substrate. A co-solvent is compatible with other components of the formulation—for example, other components are soluble in, and unreactive with, the co-solvent. The co-solvent may be, for example, toluene, tetrahydrofuran, methyl ethyl ketone, or ethyl acetate. A co-solvent may dilute a switching material from about 5% to about 50%, or any amount or range therebetween. After coating, the co-solvent may be removed (e.g. by evaporation) before applying a second substrate, or another layer of switching material, or before incorporating the optical filter comprising the switching material into a composite optical filter.

Other components of the switching material may include a tinting agent, a UV blocker (e.g. benzotriazoles, benzophenones or the like), a UV stabilizer (e.g. HALS) or the like, present in an amount from about 0.1% to about 10% or any amount or range therebetween.

Preparation of Optical Filters

An optical filter according to various embodiments of the invention may be manufactured by any suitable process, for example, wet-coating a switching material onto one or more substrates, allowing for a roll-to-roll manufacturing process, and avoiding sputter-coating or vapour deposition, or other more complex and/or more expensive processes. The switching material may be formulated for application as a liquid, gel or sol-gel, and thickened, set or cross-linked after application, forming a layer on the transparent substrate or layer. An optical filter may be applied to the surface of a display, and may be affixed using an adhesive. Switching material may be directly applied to a surface of, or to be used in, a display, and laminated with a substrate.

The switching material may be a thermoplastic, thermosetting (uncured) or thermoset (cured) material. The switching material may be a viscoelastic material (an "elastomer"). Where the switching material is a thermoset material, it may be cured by heating, exposure to UV light, chemical reaction, irradiation, electron beam processing or a combination thereof. The switching material may be coated onto an article using coating techniques such as dipping, spraying, spin-coating, powder coating or the like. The switching material, or one or more components of the switching material, may be formed into pellets, chips or flakes and mixed with other components of the switching material and/or a thermoplastic material (e.g. in a screw mixer) and extruded to form one or more layers or films. The mixer and/or extruder may be heated. Alternately, the extruded material may itself be pelletized, for subsequent blending with other, compatible, thermoplastic materials and extruded in a second extruder to produce a transparent, translucent or opaque film, or injection molded into a mold to produce a transparent, translucent or opaque article. For operation, the switchable optical filter may be a film and applied to a surface of a display, or offset from a surface of the display by a suitable distance (e.g. an air gap). The film may be flexible and suitable for cutting to a desired shape; alternately, the film may be provided in one or a set of standard sizes and a suitable size selected. An adhesive may be used to affix the film to a surface of the display. Once secured, the light source(s) may be connected to the electrical system and a switch provided for operation.

PCT Publication WO2010/142019 describes methods for making an optical filter. Generally, a first substrate or layer is provided and the switching material is coated or deposited on a first side of the substrate or layer. A second layer may be applied on top of the switching material (and may comprise a non-removable portion of the optical filter, or may be a peel-away layer to facilitate later placement of the optical filter on a display surface), or the switching material may be placed in contact with a switching material applied to a second substrate, to provide an optical filter comprising 2 layers of switching material.

In one embodiment, the switching material has a high viscosity at room temperature and is made into a lower-viscosity liquid by heating to allow it to be applied or coated onto the substrates. In one embodiment, the switching material is heated and pressed between the substrates. According to another embodiment of the invention, the switching material is first cast as a liquid and then further treated to increase the viscosity of the material to form a gel. For example, the switching material can be dried wherein the solvent or co-solvent is evaporated from the switching material. In other embodiments, the switching material is cured to increase the viscosity to form a gel. Curing the switching material may be accomplished with temperature, UV light or an initiator (catalyst). Other methods of curing such as exposure to electron beams may be possible with different formulations. The gelled switching material can then adhere to both first, second, or first and second substrates or layers to form an integral structure.

An optical filter may further comprise additional components such as tinted glass (e.g. grey, brown, bronze, reflective or other glass), static cutoff filters (coloured filters for selective transmission of visible light). In some embodiments, the optical filter may comprise one or more UV blocking components (UV blocker, or UV blocking layer) to block some or a substantial amount of the UV light that the device of the invention is exposed to in order to counteract UV light-induced degradation of the switching material or to prevent 'escape' of UV light from the optical filter, and expose a user to UV light. The UV blocker may be incorporated in the substrate or applied as a layer on a substrate, or applied as a layer of a device or apparatus according to various embodiments of the invention. The layer may be a deposited organic or inorganic material or combination thereof, or may be a film. A UV blocker may be deposited by any suitable method, for example chemical vapor deposition, physical vapor deposition, (e.g. sputtering, electron beam evaporation, and ion plating), plasma spray techniques, sol-gel processes or the like. In some embodiments, an adhesive employed to affix one or more optical filters may be, or comprise, a UV blocker. Examples of UV blockers include $WO_2$, $WO_3$, ZnO, CdO or a combination thereof; thin film materials (e.g. a dichroic filter) with thickness and index of refraction chosen so as to reflect or absorb UV light; a UV absorbing polymer or a polymer comprising a light-absorbing or UV stabilizing component. Examples of such polymers include polyethylenes, polypropylenes, polybutylenes, epoxies, acrylics, urethanes, vinyls including polyvinyl chloride, poly(vinyl butyral), poly(vinyl alcohol), acetates, polystyrenes, polyimides, polyamides, fluorocarbon polymers, polyesters, polycarbonates, poly(methyl methacrylate), poly(ethyl methacrylate), poly(vinyl acetate), or co-polymers or polymer blends thereof. In some embodiments, the substrate is PET comprising a UV blocking additive (e.g. XST6578 from DuPont Teijin). Such a substrate may be a UV blocking layer. In some embodiments, the substrate may have applied to one or both sides of it a UV, selective UV, IR, selective IR or selective VIS light blocking layer; the blocking layer may be in the form of a coating or film. A selective UV, VIS or IR blocking layer selectively blocks (absorbs or reflects) a portion of UV, VIS or IR light, respectively. Examples of UV blocking films that may be applied include EnergyFilm™ (described in WO2002/018132) and EnerLogic™ (described in WO2009/087575). Examples of UV blocking layers include optical clear pressure sensitive adhesives with UV blocking components (e.g. 8172PCL from 3M). In one embodiment, the UV blocker blocks most of the UV light below about 350 nm, or below about 365 nm, or below about 375 nm, or below about 380 nm, or below about 385 nm, or below about 400 nm. In some embodiments the UV blocking layer may comprise PVB. In some embodiments, the optical filter comprises a switching material that is transitionable to a dark state when exposed to UV light that is greater than about 350 nm, or greater than about 365 nm, or greater than about 375 nm, or greater than about 385 nm, or greater than about 385 nm. In some embodiments, the optical filter may comprise an IR blocking component, or IR blocking layer. Examples of IR blocking layers include transparent metal oxide layers, XIR films (Southwall), such as XIR-75 Blue.

Once the filter has been made, it can be cut to size, sealed around the perimeter if necessary, and a light source affixed (e.g. strips or rows of LEDs, or individual LEDs inserted or affixed along the edge of the optical filter), or the optical filter mounted within a frame, the frame may comprise a light source with electrical connectors for operation of the light source and connection to control electronics. The LEDs in turn may be provided with an electrical connection (s) for connecting to as power source.

Glass Lamination An optical filter may be laminated by placing it between two layers of adhesive resin (PVB or EVA sheet), and this in turn placed between two layers of glass (e.g. 3 mm float glass) The assembly may be passed through a press roll or pressed between plates at an elevated temperature (about 90° C. to about 140° C.—pressure and temperature may be increased and decreased over several steps), or may be placed in a bag (rubber), with an initial bonding at a temperature of about 70° C.-110° C., while applying a vacuum to remove air between the layers. A second bonding step is then performed at a temperature of about 120° C.-150° C., with pressure (e.g. about 0.95 to about 1.5 MPa in an autoclave). The overall thickness of the laminated glass is dependent, in part on the thickness of the various layers, generally an overall thickness of about 6.3 to about 6.6 mm is preferred.

Control Electronics

For operation, the one or more light sources are connected to a power source capable of providing sufficient power to illuminate the switching material, and in some embodiments the display and the switching material, with an intensity sufficient to effect a transition of the switching material from a dark to a faded state or from a faded to a dark state. Control electronics may be used to switch the power on or off based on input from a user or some other input, and can also be used to modulate the power to a suitable level (e.g. to control brightness of the display. Control electronics may be configured to turn the UV light source and display on and off as desired. In one embodiment, the UV light source may be coupled to the display and/or VIS light source so that when the display and/or VIS light source is turned on, the UV is off, and the visible light fades the switching material, enhancing the visibility of the display information. Where the switching material is electrochromic, additional electrical connectors connect electrodes in contact with the switching material to a power source that may be turned on to electrofade the switching material. Configurations for connecting an electrochromic switching material to a power source are described in commonly owned applications WO2010/142019 and U.S. 61/661,690.

Control electronics may include a switch for manual, automatic, or semi-automatic operation of the light sources. The one or more switches may be, for example, a transistor, a relay or an electromechanical switch. In some embodiments, the control circuit may further comprise an AC-DC and/or a DC-DC converter for converting the voltage from the voltage source to an appropriate voltage for the light source. The control circuit may comprise a DC-DC regulator for regulation of the voltage. The control circuit may further comprise a timer and/or other circuitry elements for applying electric voltage to the optical filter for a fixed period of time following the receipt of input. A switch may be activated manually or automatically in response to predetermined conditions, or with a timer. For example, control electronics may process information such as time of day, ambient light levels detected using a light sensor, user input, stored user preferences, occupancy levels detected using a motion sensor, or the like, or a combination thereof, the control electronics configured to activate switches for applying power to the light source in response to the processed information in accordance with predetermined rules or conditions, or a timer. In one embodiment, the power control electronics comprises a user-activated switch that passes the DC voltage from the power source substantially directly to the light source. A user-activated switch may be a 'normally-open', or 'normally-closed' switch, for example a push-button switch. A switch may be configured to remain closed for a predetermined amount of time following actuation, thereby facilitating application of voltage to the light source for sufficient time to effect a state transition of the optical filter.

Where the switching material is electrochromic, the voltage to be applied for transitioning one or more of the optical filters may be dependent on factors such as the switching material composition and/or the resistivity of the electrodes in contact with the electrochromic switching material. The voltage may be fixed or it may be controllable by the control system. Voltage applied to an optical filter may be from about 0.1 V to about 20 V, or any amount or range therebetween, for example, 1, 2, 3, 4, 5, 6, 7, 8, 9, 10, 11, 12, 13, 14, 15, 16, 17, 18 or 19 V. In some embodiments, the amount of voltage applied is from about 0.1V to about 5V, or from about 1V to about 10 V, or from about 1.0 V to about 2.2 V, or from about 0.5V to about 3V, or from about 1.2V to about 2.5 V, or from about 1.8 V to about 2.1 V, or any amount or range therebetween. In some embodiments, the voltage applied is less than about 12 V, or less than about 6 V, or less than about 3 V or less than about 2.5 V, or about 2 V.

In some embodiments, a switching material comprising a compound according to Formula II may be faded with application of a voltage of about 2.2V. In some embodiments, a switching material comprising a compound according to Formula I maybe faded with application of a voltage of about 2.0 V.

Commonly owned application PCT/CA2013/000054 describes composite optical filters with two or more optical filter; each optical filter may include the same, or different chromophore, in the switching material. As indicated above, chromophores of Formula I and II may necessitate the use of different voltages to effect the electrochemical switch from dark to faded state—this may preclude the inclusion of both Formula I and Formula II chromophores in the same switching material where the switching material is to be faded with electricity—it is not possible to simultaneously apply two different voltages to a switching material, and if the chromophores are in the same switching material, not possible to isolate one from another to prevent damage from overvoltage. By combining chromophores of Formula I and Formula II in the same layer of switching material as per embodiments described herein, and coupling the optical filter with the switching material in an apparatus comprising a light source that provides light of suitable wavelength to fade, darken, or fade and darken the switching material, the present disclosure provides an advance over the art by providing controllable darkening of what may previously have been considered a passively darkening material. Inclusion of one or more selective filters in the apparatus to prevent egress of the controllable light (e.g. to isolate a user from a UV light source), or prevent ingress of external light (e.g. to prevent uncontrolled fading or darkening of the switching material) may provide a further advantage by isolating the optical filter comprising the switchable material.

Testing and Use of Optical Filters

Performance of an optical filter may be tested by conducting studies using standard techniques in the art, for example, measurement of LT, haze, switching speed, photostability, and/or durability. WO2010/142019 describes methods, equipment and techniques that may be used to assess the performance of optical filters. The optical filters of the present invention can be incorporated into a variety of applications. In particular, optical filters of the invention are especially applicable in systems where it is desirable to dynamically control and filter light. The optical filters of the invention can be used as-is or can be laminated onto another substrate such as glass or polycarbonate. Selection of a particular set of characteristics (e.g. LT in the faded and dark states) may be dependent on the use of the optical filter.

Synthesis of Ring-Closed or Ring-Open Isomer of Compounds: Where a preparation of a ring-closed isomer is desired (as an isolated compound, e.g. for NMR studies, or some syntheses), the compound may be dissolved in $CH_2Cl_2$ and placed in a quartz glass cell. The solution was irradiated at 365 nm for 10 minutes, or until no further change in absorbance is observed. Solvent was evaporated off under reduced pressure and the product purified using HPLC to afford the respective ring-closed isomer. Where a preparation of a ring-open isomer is desired (as an isolated compound, e.g. for NMR studies, or some syntheses), the compound may be dissolved in $CH_2Cl_2$ and placed in a quartz glass cell as described. The solution may be irradiated with visible light comprising a wavelength of ~500 to 700 nm for 10 minutes, or until no further change in absorbance is observed. Solvent may be evaporated off under reduced pressure and the product purified using HPLC to afford the respective ring-open isomer.

EXAMPLE 1

Preparation of an Optical Filter

Figure 13:
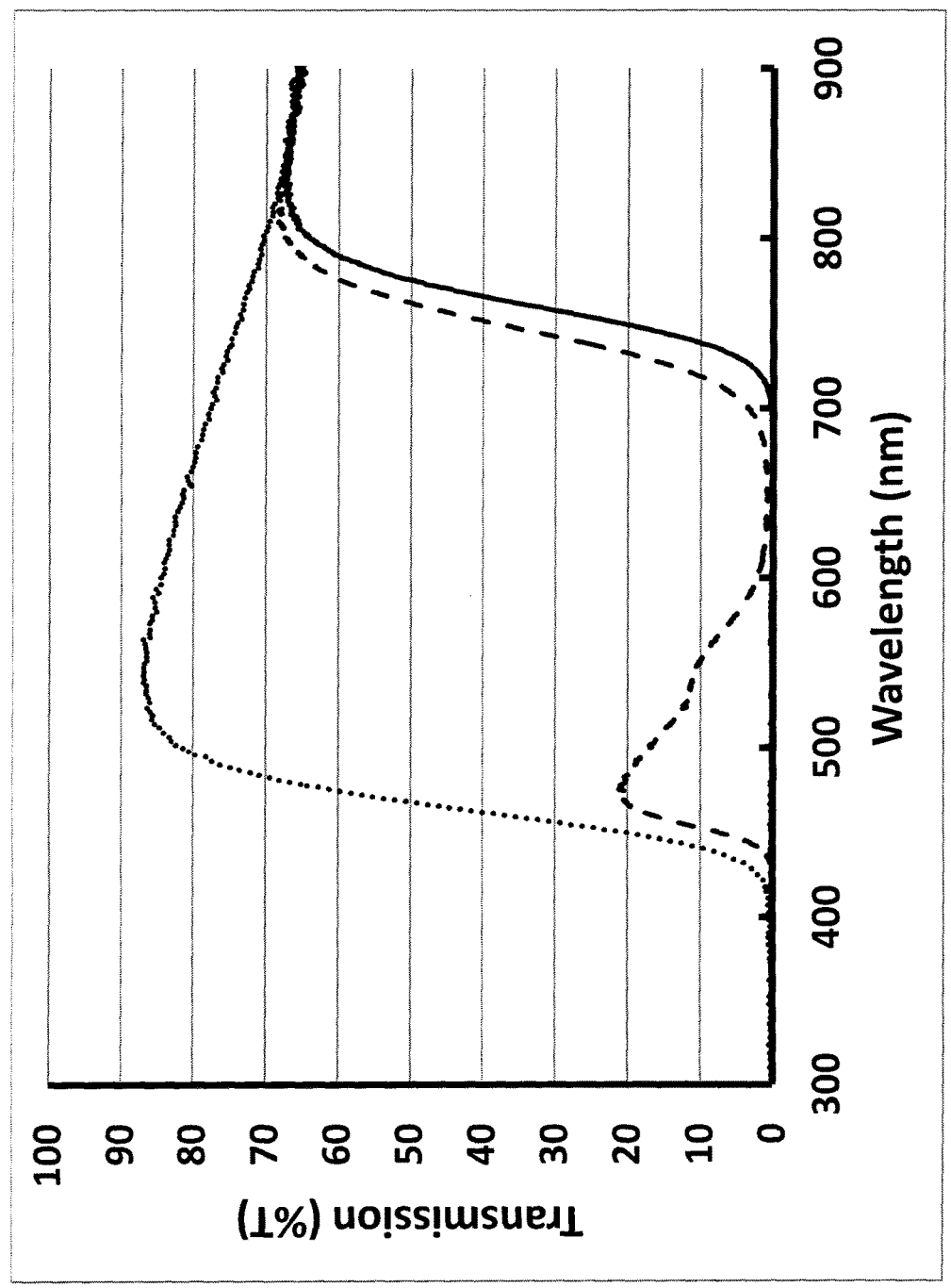
FIG. 13 shows transmission spectra of an optical filter comprising a switching material. Dotted line—transmission in faded state; dashed line—transmission in dark state (solar simulator light source); solid line, transmission in dark state (UV-only light source), according to another embodiment.

Switching material comprising 10 wt % chromophore (1:1 S158:S161) in solvent (dimethyl 2-methylpentanedioate) was prepared and placed in a glass cell testing cell (50 micron thick chamber) and sealed. The switching material was darkened with simulated sunlight (Solar Simulator—ScienceTech), or UV (365 nm) light, and transmission spectra were obtained (using an Ocean Optics spectrophotometer) for each state (FIG. 13). The switching material was then faded with a low-pressure sodium lamp (575-585 nm light and transmission spectra obtained). In a fully faded state, transmission is high and the switching material is transparent. With exposure to a UV light source (simulated sunlight or 365 nm source), the switching material attains a dark state with a light transmittance ($LT_A$) in a faded state of 84.4%, 6.8% when darkened with simulated sunlight (contrast ratio of about 12), and 0.10 when darkened with 365 nm UV light (contrast ratio of 832).

The present invention has been described with regard to one or more embodiments. However, it will be apparent to persons skilled in the art that a number of variations and modifications can be made without departing from the scope of the invention as defined in the claims. Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art to the present invention. Citation of references herein does not constitute any admission as to the contents or date of the references. All publications are incorporated herein by reference as if each individual publication was specifically and individually indicated to be incorporated by reference herein and as though fully set forth herein. The invention includes all embodiments and variations substantially as hereinbefore described and with reference to the examples and drawings.

It is contemplated that any embodiment discussed in this specification can be implemented or combined with respect to any other embodiment, method, item, composition or aspect of the invention, and vice versa.

What is claimed is:

1. An apparatus comprising:
   a. a switchable optical filter comprising a layer of switchable material, the switchable material comprising: a photochromic and thermochromic compound configured to cause the switchable material to transition from a first state to a second state in response to light of a wavelength within a first range of wavelengths, and from the second state to the first state in response to heat; or a photochromic and electrochromic compound photochromic and electrochromic compound configured to cause the switchable material to transition from the first state to the second state in response to light of a wavelength within the first range of wavelengths, and from the second state to the first state in response to application of a voltage, wherein a light transmittance of the switchable optical filter in the first state is greater than a light transmittance of the switchable optical filter in the second state;
   b. a first light source providing light of a wavelength within the first range of wavelengths; and
   c. a switch for controlling activation of the first light source.

2. The apparatus of claim 1, wherein the first light source provides light with a wavelength of less than about 450 nm or from about 350 to about 420 nm.

3. The apparatus of claim 1, further comprising one or more UV blocking layers, a light dispersing layer, or one or more UV blocking layers and a light dispersing layer.

4. The apparatus of claim 1, further comprising a second light source.

5. The apparatus of claim 4, wherein the second light source provides light of a wavelength within a second range of wavelengths.

6. The apparatus of claim 5, wherein the second light source provides light with a wavelength of from about 450 nm to about 650 nm, or light with a wavelength of from about 575 to about 650 nm.

7. The apparatus of claim 1, wherein the switchable optical filter is transitionable from the first state to the second state with application of 350 to 420 nm light.

8. The apparatus of claim 1, wherein the switchable optical filter comprises a switching material comprising a compound according to Formula IA/B that is reversibly convertible between a ring-open isomer A and a ring-closed isomer B, a compound according to Formula IIA/B that is reversibly convertible between a ring-open isomer A and a ring-closed isomer B, or the compound according to Formula IA/B and the compound according to Formula IIA/B, wherein;

tochromic and thermochromic compound configured to cause the switchable material to transition from a first state to a second state in response to light of a wavelength within a first range of wavelengths, and from the second state to the first state in response to heat; or a photochromic and thermochromic compound configured to cause the switchable material to transition from the first state to the second state in response to light of a wavelength within the first range of wavelengths, and from the second state to the first state in response to application of a voltage, wherein a light transmittance of the switchable optical filter in the first state is greater than a light transmittance of the switchable optical filter in the second state.

13. The display apparatus of claim 12, further comprising a first light source and optionally a second light source, the first light source providing light of a wavelength within the first range of wavelengths, and the optional second light source providing light of a wavelength within a second range of wavelengths.

14. The display apparatus of claim 13, further comprising a light dispersing layer, a UV blocking layer, or a light dispersing layer and a UV blocking layer.

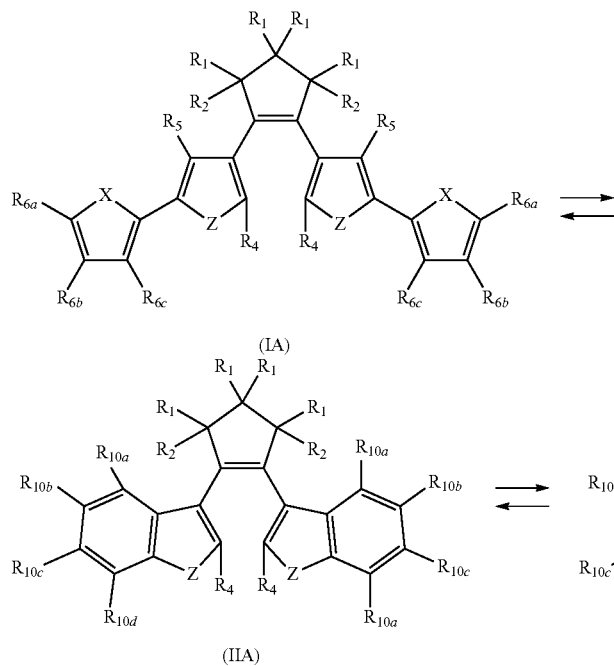

(IA) (IIA)

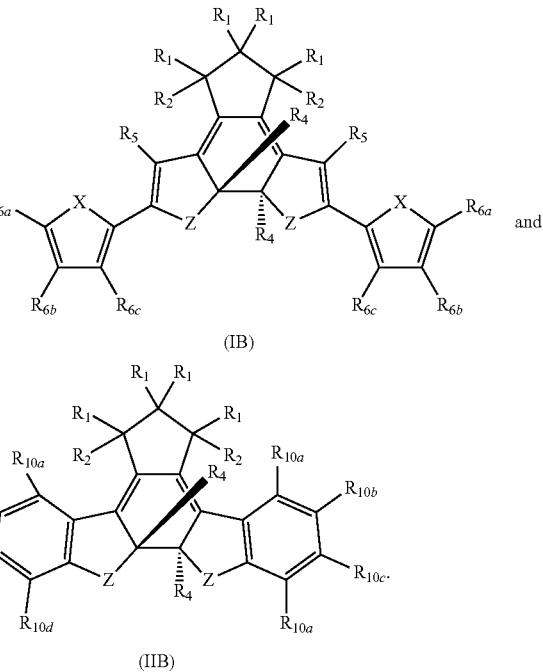

(IB) and (IIB)

9. The apparatus of claim 1, wherein the switching material is transitionable from the first state to the second state of 1% or less light transmittance with application of light with a wavelength of less than about 450 nm.

10. The apparatus of claim 1, wherein the first light source is adjacent to one or more edges of the switchable optical filter.

11. The apparatus of claim 1 wherein the first light source is adjacent to one or more surfaces of the switchable optical filter.

12. A display apparatus comprising:
a display; and
a switchable optical filter comprising a layer of switchable material, the switchable material comprising: a pho- 15. The display apparatus of claim 13, wherein the first light source, the second light source, or the first and the second light sources us located at a periphery of the optical filter.

16. The display apparatus of claim 13 wherein the first light source, the second light source, or the first and the second light sources is on a plane parallel, or substantially parallel, to the display.

17. The display apparatus of claim 13, wherein the first light source, the second light source, or the first and the second light sources is offset from the plane of the display, the plane of the optical filter, or the plane of the display and the plane of the optical filter.

18. The display apparatus of claim 13, wherein the switchable optical filter is spaced apart from a surface of the display.

19. The display apparatus of claim 13, wherein the first light source provides light with a wavelength of less than about 450 nm, or from about 350 to about 420 nm, and the second light source provides light with a wavelength of from about 450 nm to about 650 nm, or light with a wavelength of from about 575 to about 650 nm.

20. An apparatus comprising:
- a switchable optical filter comprising a layer of switchable material, the switchable material comprising a photochromic compound configured to cause the switchable material to transition from a first state to a second state in response to light of a wavelength within a first range of wavelengths, and from the second state to the first state in response to light of a wavelength within a second range of wavelengths, wherein a light transmittance of the switchable optical filter in the first state is greater than a light transmittance of the switchable optical filter in the second state;
- a light dispersing layer;
- a light source providing light of a wavelength within the first range of wavelengths or the second range of wavelengths, wherein the light source is adjacent to one or more edges of the switchable optical filter such that the light of a wavelength within the first range of wavelengths or the second range of wavelengths is transmitted across the switchable optical filter and is dispersed onto the switchable optical filter by the light dispersing layer; and
- a switch for controlling activation of the first light source.

* * * * *

UNITED STATES PATENT AND TRADEMARK OFFICE
CERTIFICATE OF CORRECTION

PATENT NO. : 10,310,300 B2
APPLICATION NO. : 15/875863
DATED : June 4, 2019
INVENTOR(S) : Neil Robin Branda et al.

It is certified that error appears in the above-identified patent and that said Letters Patent is hereby corrected as shown below:

In the Claims

In Claim 12, Column 44, Line 6 please replace "photochromic and thermochromic compound" with -- photochromic and electrochromic compound --

Signed and Sealed this
Twentieth Day of August, 2019

Andrei Iancu
*Director of the United States Patent and Trademark Office*